(12) United States Patent
Choi et al.

(10) Patent No.: US 11,698,480 B2
(45) Date of Patent: Jul. 11, 2023

(54) OPTICAL PRODUCT AND OPTICAL FILTER INCLUDING SAME

(71) Applicant: LMS Co., Ltd., Pyeongtaek-si (KR)

(72) Inventors: Jeong Og Choi, Seoul (KR); Joo Young Kim, Suwon-si (KR); Seon Ho Yang, Seoul (KR); Min Soo Lee, Uiwang-si (KR); Yong Won Choi, Suwon-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 527 days.

(21) Appl. No.: 16/651,789

(22) PCT Filed: Sep. 21, 2018

(86) PCT No.: PCT/KR2018/011206
§ 371 (c)(1),
(2) Date: Mar. 27, 2020

(87) PCT Pub. No.: WO2019/066398
PCT Pub. Date: Apr. 4, 2019

(65) Prior Publication Data
US 2020/0241185 A1    Jul. 30, 2020

(30) Foreign Application Priority Data

Sep. 28, 2017 (KR) .................. 10-2017-0125920

(51) Int. Cl.
*G02B 5/22* (2006.01)
*G02B 5/20* (2006.01)
(Continued)

(52) U.S. Cl.
CPC ............ *G02B 5/226* (2013.01); *C08K 5/3417* (2013.01); *C09B 57/00* (2013.01); *G02B 5/208* (2013.01); *G03B 11/00* (2013.01)

(58) Field of Classification Search
CPC ... G02B 5/20; G02B 5/22; G02B 5/26; G02B 5/28; G02B 5/226; G02B 5/223;
(Continued)

(56) References Cited

U.S. PATENT DOCUMENTS

2007/0293606 A1    12/2007   Yamada
2014/0264202 A1     9/2014   Nagaya et al.
(Continued)

FOREIGN PATENT DOCUMENTS

CN    101881850 A    11/2010
CN    106062591 A    10/2016
(Continued)

OTHER PUBLICATIONS

Chinese Office Action dated Jun. 3, 2021 issued in counterpart patent Application No. 201880060716.7 w/English Translation (27 pages).
(Continued)

*Primary Examiner* — Jie Lei
(74) *Attorney, Agent, or Firm* — Polsinelli PC

(57) ABSTRACT

The present invention relates to an optical article, and an optical filter and an imaging device including the same. The optical article comprises: a near-infrared absorption glass substrate including a divalent copper ion as a chromatic ingredient; and a pigment dispersion layer formed on one surface or both surfaces of the near-infrared absorption glass substrate and having a near-infrared absorption pigment and an ultraviolet absorption pigment dispersed across the resin matrix thereof. Provided with a first and a second transmission cut-off region, the optical article has the advantage of allowing the fabrication of an excellent near-infrared cut-off filter that can effectively block light in near-infrared and ultraviolet bands and does not permit a difference in color sense with the change of incident angles.

14 Claims, 8 Drawing Sheets

(a)

(b)

(c)

(51) Int. Cl.
*C08K 5/3417* (2006.01)
*C09B 57/00* (2006.01)
*G03B 11/00* (2021.01)

(58) Field of Classification Search
CPC ........ G02B 5/208; G02B 5/281; G02B 5/282; G02B 5/0833; G02B 1/04; H01L 27/146; H01L 27/14618; H01L 27/14621; H01L 27/14625; G03B 11/00; C08K 5/3417; C09B 57/00
USPC ....... 359/885, 887, 890, 580, 589, 350, 359, 359/361; 252/582, 587, 588, 589
See application file for complete search history.

(56) References Cited

U.S. PATENT DOCUMENTS

| | | |
|---|---|---|
| 2014/0350146 A1 | 11/2014 | Tsubouchi |
| 2017/0017023 A1 | 1/2017 | Sugiyama et al. |
| 2017/0017024 A1 | 1/2017 | Hasegawa et al. |

FOREIGN PATENT DOCUMENTS

| | | |
|---|---|---|
| JP | 6103152 B2 | 3/2017 |
| JP | 2017-146506 A | 8/2017 |
| KR | 10-2014-0069130 A | 6/2014 |
| KR | 10-2014-0088559 A | 7/2014 |
| KR | 10-2017-0054322 A | 5/2017 |
| WO | 2006/043715 A1 | 4/2006 |
| WO | 2017/146413 A2 | 8/2017 |

OTHER PUBLICATIONS

International Search Report from International Application No. PCT/KR2018/011206 dated Mar. 7, 2019 in 3 pages.

(a)

(b)

(a)

(b)

(c)

USOO11698480B2

OPTICAL PRODUCT AND OPTICAL FILTER INCLUDING SAME

CROSS REFERENCE TO RELATED APPLICATIONS

This application is a National Phase Entry of PCT International Application No. PCT/KR2018/011206, which was filed on Sep. 21, 2018, and claims priority to Korean Patent Application No. 10-2017-0125920, which was filed on Sep. 28, 2017, the contents of which are incorporated herein by reference.

TECHNICAL FIELD

The present invention relates to an optical component which an optical filter comprises, and particularly, it relates to an optical filter including an optical component which inhibits the transmission of light in the near-infrared and ultraviolet light wavelength region and being capable of significantly reducing the short-wavelength shift at the curve representing the visible light transmission rate with respect to the increment of the incident angle of the light.

BACKGROUND ART

To obtain a color image which represents natural color which a human eye can see, CIS (CMOS Image Sensor), such as a solid state image pickup element using the image pickup device essentially requires an optical component which can closely correct to a human's visibility by cutting off light in the near-infrared light region which is in 700 nm to 1,200 nm wavelength range which a sensor detects and by transmitting the light in the visible light region which is in 400 nm to 600 nm wavelength range.

Such optical components are a reflective type near-infrared cut-off filter which forms dielectric multi-layers on both sides of a conventional optical glass or an absorption type near-infrared cut-off filter which forms dielectric multi-layers on both sides of a near-infrared absorption glass substrate including copper II ions as a coloring components rather than the conventional optical glass, etc. However, for a conventionally used reflective type near-infrared cut-off filter, it has a limitation of not being able to be used for a high resolution (for example 5 mega pixels or more) camera module because there is a problem of seriously causing color (or color temperature) difference with respect to the position of the captured image since a spectral transmission rate curve in the visible light region with respect to the increment of the incident angle of a light source shifts toward to the short wavelength (referred to as "short-wavelength shift").

In addition, for a conventional absorption type near-infrared cut-off filter, since its cut-off effectiveness in the ultraviolet region and the infrared in 700 nm to 1,200 nm wavelength range is not sufficient only with a near-infrared absorption glass, it additionally cuts off the ultraviolet and the near-infrared light by forming dielectric multilayers on both sides of the near-infrared absorption glass substrate.

However, as the introduction of a wide-angle lens has increased in recent years, a problem causing color difference for the absorption type near-infrared cut-off filter has started to arise because the range of incident angle of incident light has widened when an image is captured. Such color difference is caused by the short-wavelength shift at the transmission rate curve in the visible light region of the near-infrared cut-off filter for a high resolution camera module adapting the wide incident angle.

Thus, it is desperately necessary to develop an optical component which has no color difference when it is adapted for a high resolution camera module that can also effectively cut off the light in the ultraviolet and the near-infrared region.

DETAILED DESCRIPTION OF THE INVENTION

Technical Problem

The object of the present invention is to provide an optical component which has an excellent transmission rate as to light having a wavelength in the visible light range, and does not cause color difference with respect to the incident angle change while it effectively cuts off the light in the ultraviolet and the near-infrared range.

Another object of the present invention is to provide an optical filter including the optical component stated above.

Another object of the present invention is still to provide an image capturing device including the optical component stated above.

Technical Solution

The present applicant and inventors have reached the present invention since they invented an optical component forming a transmission cut-off region having a pre-determined wavelength width strictly controlled to be a spectral transmission rate in the near-infrared and the ultraviolet region having a value below a pre-determined transmission rate by improving the conventional near-infrared absorption glass substrate to have a pre-determined spectral characteristic and by providing a dye dispersion layer on one or both sides of the substrate and thereby they found to be able to obtain a high quality image having no color difference on the captured image by controlling the change of the integral value (area) of the spectral transmission rate in a pre-determined visible light wavelength region being 1% or less despite the incident angle being increased to 40°.

To solve the above object of the present invention, according to one embodiment of the present invention, a near-infrared absorption glass substrate including Copper II ions as a coloring component and a shortest wavelength (Cut-off T50%) which has an average transmission rate in 430nm to 565nm wavelength range being 90% or more and a transmission rate in a range for the wavelength longer than 565 nm being 50% being shown between 660 nm to 690 nm; and an optical component including a dye dispersion layer which is formed on one or both sides of the near-infrared absorption glass substrate and in which a near-infrared absorption dye and a ultraviolet absorption dye is dispersed in a resin matrix, where the optical component comprises a first transmission cut-off region showing 1% or less transmission rate in 690 nm to 730 nm wavelength region and a second transmission cut-off region showing 25% or less transmission rate in 360 nm to 410 nm wavelength region when a transmission rate curve for the optical component is measured at a 0° incident angle using a spectrophotometer in a wavelength range of 300 nm to 1,200 nm and it satisfies a following condition (A) to (B), (A) a wavelength width (W1) of the first transmission cut-off region is 5 nm to 25 nm and (B) a wavelength width (W2) of the second transmission cut-off region is 5 nm to 45 nm.

In addition, according to one embodiment of the present invention, it provides an optical filter and an image capturing device including the optical component.

Effect of Invention

An optical component according to the present invention comprises a near-infrared absorption glass substrate and a dye dispersion layer in which a near-infrared absorption dye and a ultraviolet absorption dye is dispersed formed on one or both sides of the near-infrared absorption glass substrate and thereby it provides the advantage of an excellent near-infrared cut-off filter showing a high transmission rate with respect to light having a wavelength in the visible light range and effectively cutting off the light in the infrared and the ultraviolet light range as well as showing no color difference with respect to the incident angle change.

DETAILED DESCRIPTION OF THE PREFERRED EMBODIMENT

Figure 1:
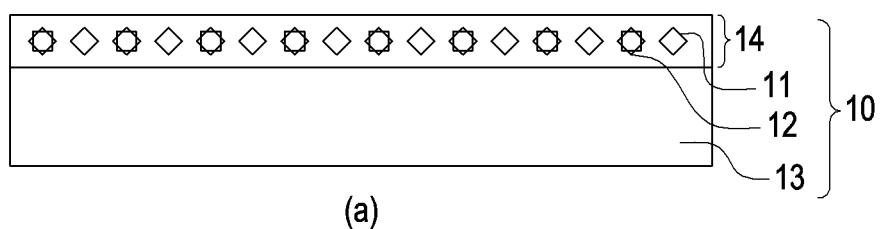
FIG. 1 is a cross-sectional view disclosing a structure of an optical component according to one embodiment of the present invention.
Figure 1:
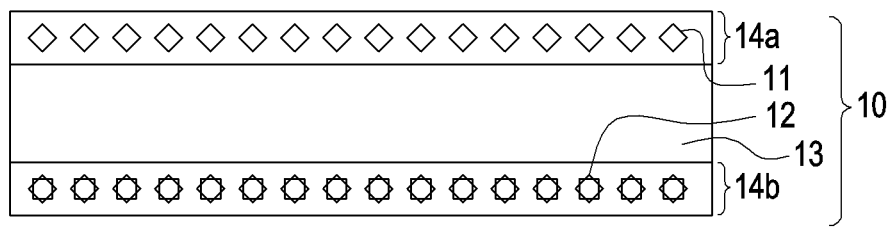

Since the present invention can be modified in various ways and can have many different embodiments, specific embodiments are illustrated in the drawings and specific descriptions are explained in detail.

However, such explanation is not to limit the present invention to a specific embodiment and therefore, it should be understood to include all modifications, equivalents and replacements within the scope of the present invention and its technology area.

In the present invention, terms such as "comprising," "having" or "consisting" are understood to indicate the existence of characteristics, numbers, steps, operations, elements, components or their combinations and not to deny the existence or possible addition of one or more of different characteristics, numbers, steps, operations, elements, components or their combinations in advance.

Furthermore, the attached drawings in the present invention are understood to be illustrated enlarged or reduced ones for the convenience of explanation.

Below, it is explained as to the present invention with the reference to the drawings, same reference numbers shall be assigned to the same corresponding elements regardless to the drawing signs and the repeated explanation shall be omitted.

In the present invention, the "visible light" is the light of which a human eye can detect the wavelength region among the electromagnetic waves and it means the light having approximately 400 nm to 700 nm wavelength range.

In the present invention, the "near-infrared" is the electromagnetic wave positioned outside of the end of red line and having a longer wavelength than the visible light and it means the light having approximately 700 nm to 1,200 nm wavelength range. In the present invention, the degree of cut-off of the "near-infrared" can be represented as the absorbance with respect to the near-infrared.

In the present invention, the "ultraviolet" is the electromagnetic wave positioned outside of the end of blue line and having a shorter wavelength than the visible light and it means the light having approximately 300 nm to 400 nm wavelength range. In the present invention, the degree of cut-off of the "ultraviolet" can be represented as the absorbance with respect to the ultraviolet.

In this case, the absorbance (OD) is defined by a commercial log value of Io/I if the intensity of the incident light is Io and the intensity of the transmitting light is I when the light transmits the absorption matter. In other words, the absorbance means a value represented by Absorbance (OD) =log(Io/I). The absorbance can be calculated by using a spectrophotometer.

In the present invention, a "maximum absorption region" means a wavelength for the maximum absorbance in the absorption spectrum when a specimen prepared by dissolving the near-infrared absorption dye or the ultraviolet absorption dye to cyclohexanone is measured in 300 nm to 1,200 nm wavelength range using spectrophotometer.

In the present invention, a "first transmission cut-off region" means a wavelength range showing a transmission rate of 1% or less in 690 nm to 730 nm wavelength range, and a "second transmission cut-off region" means a wavelength range showing a transmission rate of 25% or less in 360 nm to 410 nm wavelength range.

In the present invention, a "wavelength width (W1) of the first transmission cut-off region" means a value of subtracting the lower limit value of the wavelength from the upper limit of the wavelength of the first transmission cut-off region and a "wavelength width (W2) of the second transmission cut-off region" means a value of subtracting the lower limit of the wavelength from the upper limit of the wavelength of the second transmission cut-off region.

In the present invention, an "average transmission rate" means an arithmetic mean value of the transmission rate with respect to a pre-determined wavelength range in a transmission rate curve for a wavelength when a transmission spectrum of a near-infrared absorbing glass substrate, an optical component and an optical filter, etc. is measured using a spectrophotometer.

In addition, in the present invention, an "incident angle" means an angle formed by a light source for measuring the transmission spectrum or the absorption spectrum of the near-infrared absorption glass substrate, the optical component and the optical filter, etc. by using a spectrophotometer and the direction perpendicular to the main surface of the optical component or the optical filter and the incident angle means to be measured at 0° unless stated otherwise.

Furthermore, in the present invention, an "alkyl group" means a substituent derived from a linear or branched type saturated hydrocarbon.

In this case, as the "alkyl group", for example, a methyl group, an ethyl group, an n-propyl group, an isopropyl group, an n-butyl group, an isobutyl group, a sec-butyl group, a t-butyl group, an n-pentyl group, a 1,1-dimethyl-propyl group, a 1,2-dimethyl-propyl group, a 2,2-dimethyl-propyl group, a 1-ethyl propyl group, a 2-ethyl-propyl group, an n-hexyl group, a 1-methyl -2-ethylpropyl group, a 1-ethyl -2-methylpropyl group, a 1,1,2-trimethyl-propyl group, a 1-propyl propyl group, a 1-methyl-butyl group, a 2-methyl-butyl group, a 1,1-dimethyl-butyl group, a 1,2-dimethyl-butyl group, a 2,2-dimethyl-butyl group, a 1,3-dimethyl-butyl group, a 2,3-dimethyl-butyl group, a 2-ethyl-butyl group, a 2-methyl-pentyl group and a 3-methyl-pentyl group, etc. can be referred.

In addition, the "alkyl group" can have a carbon number of 1 to 20, for example, it can have a carbon number of 1 to 6 or a carbon number of 1 to 4.

Furthermore, in the present invention, a "cycloalkyl group" means a substituent derived from a monocyclic saturated hydrocarbon.

As the "cycloalkyl group", for example, a cyclopropyl group, a cyclobutyl group, a cyclo-pentyl group, a cyclohexyl group, a cyclo heptyl group and a cyclo octyl group, etc. can be referred.

In addition, the "cycloalkyl group" can have a carbon number of 3 to 20, for example, it can have a carbon number of 3 to 12 or a carbon number of 3 to 6.

Furthermore, in the present invention, an "aryl group" means a monovalent substituent derived from an aromatic hydrocarbon.

In this case, as the "aryl group", for example, a phenyl group, a naphthyl group, an anthracenyl group, a phenanthryl group, a naphtha hexenyl group, a pyrenyl group, a tolyl group, a biphenyl group, a terphenyl group, a chrycenyl group, a spirobifluorenyl group, a fluoranthenyl group, a fluorenyl group, a perylenyl group, an indenyl group, an azulenyl group, a heptalenyl group, a phenalenyl group and a phenanthrenyl group, etc. can be referred.

Furthermore, the "aryl group" can have a carbon number of 6 to 30, for example, it can have a carbon number of 6 to 10, a carbon number of 6 to 14, a carbon number of 6 to 18 or a carbon number of 6 to 12.

In addition, in the present invention, a "heteroaryl group" means an "aromatic heterocyclic ring" or a "heterocyclic" derived from a monocyclic or a condensed ring. The "heteroaryl group" can include at least one, for example, one, two, three or four of nitrogen (N), sulfur (S), oxygen (O), phosphorus (P), selenium (Se) and silicon (Si) as a hetero atom.

In this case, as the "heteroaryl group", for example, a nitrogen-containing heteroaryl group including a pyrrolyl group, a pyridyl group, a pyridinyl group, a pyridazinyl group, a pyrimidinyl group, a pyrazinyl group, a triazolyl group, a tetrazolyl group, a benzotriazolyl group, a pyrazolyl group, an imidazolyl group, a benzimidazolyl group, an indolyl group, an indolinyl group, an isoindolyl group, an indolizinyl group, a purinyl group, an indazolyl group, a quinolyl group, an isoquinolinium group, a quinolizinyl group, a phthalazinyl group, a naphthylidinyl group, a quinoxalinyl group, a quinazolinyl group, a cinnolinyl group, a pteridinyl group, an imidazotriazinyl group, an acridinyl group, a phenanthridinyl group, a carbazolyl group, a carbazolinyl group, a pyrimidinyl group, a phenanthrolinyl group, a phenazinyl group, an imidazopyridinyl group, an imidazopyrimidinyl group and a pyrazolopyridinyl group, etc.; a sulfur-containing heteroaryl group including a thienyl group, benzothienyl group and a dibenzothienyl group, etc.; and an oxygen-containing heteroaryl group including a furyl group, a pyranyl group, a cyclopentapyranyl group, a benzofuranyl group, an isobenzofuranyl group, a dibenzofuranyl group, a benzodioxole group, a benzotrioxole group, etc. can be referred.

Also, as a specific example for the "heteroaryl group", a compound containing at least two hetero atoms such as a thiazolyl group, an isothiazolyl group, a benzothiazolyl group, a benzothiadiazolyl group, a phenothiazinyl group, an isoxazolyl group, a furazanyl group, a phenoxazinyl group, an oxazolyl group, a benzoxazolyl group, an oxadiazolyl group, a pyrazoloxazolyl group, an imidazothiazolyl group, a thienofuranyl group, a furopyrrolyl group and a pyridoxazinyl group, etc. can be referred.

Furthermore, the "heteroaryl group" can have a carbon number of 2 to 20, for example, it can have a carbon number of 4 to 19, a carbon number of 4 to 15 or a carbon number of 5 to 11. For example, if hetero atoms are included, the heteroaryl group can have a ring member of 5 to 21.

Additionally, in the present invention, an "aralkyl group" means a saturated hydrocarbon substituent where a monovalent substituent derived from an aromatic hydro carbon is bonded at a hydrogen position of the end of the hydrocarbon. In other words, the "aralkyl group" represents an alkyl group where the end of a chain is substituted by an aryl group and for example, a benzyl group, a phenethyl group, a phenylpropyl group, a naphthalenylmethyl group and a naphthalenylethyl group, etc. can be referred.

Below, the present invention will be described in detail.

<Optical Component>

In one preferred embodiment, an optical component according to the present invention comprises a near-infrared absorption glass substrate including a dye containing copper II ions as a coloring component wherein an average transmission rate is 90% or more in 430 nm to 565 nm wavelength range and a shortest wavelength (Cut-Off T50%) where the transmission rate is 50% in the wavelength region longer than the 565 nm wavelength is shown in 660 nm to 690 nm range; and a dye dispersion layer formed on one or both sides of the near-infrared absorption glass substrate and dispersing a near-infrared absorption dye and a ultraviolet absorption dye in a resin matrix. As one example, the near-infrared absorption dye can have a maximum absorption region in 690 nm to 750 nm range and the ultraviolet absorption dye can have a maximum absorption region in 350 nm to 410 nm wavelength range. The near-infrared absorption dye and the ultraviolet absorption dye may use two or more absorption dyes which have the maximum absorption region in the respective wavelength range.

In addition, the optical component according to the present invention comprises a first transmission cut-off region showing 1% or less transmission rate in 690 nm to 730 nm wavelength region and a second transmission cut-off region showing 25% or less transmission rate in 360 nm to 410 nm wavelength region when the transmission rate curve for the optical component is measured at a 0° incident angle using a spectrophotometer in a wavelength range of 300 nm to 1,200 nm and it satisfies a following condition (A) to (B), (A) The wavelength width (W1) of the first transmission cut-off region is 5 nm to 25 nm and (B) The wavelength width (W2) of the second transmission cut-off region is 5 nm to 45 nm.

Since the optical component according to the present invention satisfies the conditions (A) an (B), it is possible to provide an optical filter which can effectively cut off light in the near-infrared and the ultraviolet region without deteriorating the transmission rate in the visible light region and does not cause color difference due to a short wavelength shift by the incident angle increment. The wavelength width (W1) may be preferably 6 nm to 24 nm and more preferably, it may be 8 nm to 23 nm. Also, the wavelength width (W2) may be preferably 7 nm to 43 nm and more preferably, it may be 9 nm to 42 nm.

Furthermore, when the absorbance curve for the optical component is normalized to be 1 (one) for the maximum value of absorbance (OD1) in the wavelength region of the first transmission cut-off region, the maximum value of absorbance (OD2) in the wavelength range of the second transmission cut-off region may satisfy the following condition of Equation 1.

$$0.2 \leq OD2 \leq 0.4 \quad \text{[Equation 1]}$$

In the present invention, OD2 values in the Equation 1 may be in a range of 0.2 to 0.4, 0.21 to 0.39, 0.23 to 0.37 or 0.25 to 0.37. When the OD2 value is smaller than 0.2, the short wavelength shift of the visible light transmission rate curve increases with the incident angle increment and the color difference is increased and when the OD2 is larger than 0.4, the visible light transmission rate decreases thereby it may be difficult to obtain a quality image when the image is captured under a low light environment. As the optical component of the present invention satisfies Equation 1 condition, it is possible to provide an optical filter preventing the occurrence of color difference by suppressing the short wavelength shift without deteriorating the transmission rate with respect to the visible light region.

FIG. 1 is a cross-sectional view disclosing a structure of an optical component. Referring FIGS. 1 (*a*) and (*b*), the optical component (10) comprises a near-infrared absorption glass substrate (13) containing copper II ions as a coloring component. A near-infrared absorption glass substrate used for a conventional near-infrared cut-off filter uses an average transmission rate of 90% or more in 430 nm to 565 nm wavelength range and the shortest wavelength (Cut-Off T50%) that is 650 nm or less where the transmission rate is 50% in the wavelength region longer than 565 nm wavelength. On the other hand, the near-infrared absorption glass substrate included in the optical component according to the present invention has preferably the average transmission rate of 90% or more in the wavelength range as stated above and Cut-Off T50% value of 660 nm to 690 nm wavelength range. The thickness of the near-infrared absorption glass substrate may be 0.140 mm to 0.220 mm range. Preferably, the thickness of the near-infrared absorption glass substrate is 0.145 mm to 0.210 mm range. By controlling the thickness of the near-infrared absorption glass substrate in the range stated above, it may be possible to provide a supporting effect to the optical component and at the same time it is possible to provide predetermined optical properties including the average transmission rate, the Cut-Off T50%, etc. as stated above. On one or both sides of the near-infrared absorption glass substrate (13), a dye dispersion layer (14, 14*a*, 14*b*) with a near-infrared absorption dye (11) and a ultraviolet absorption dye (12) dispersed in a resin matrix is formed. FIG. 1(*a*) discloses a structure where the dye dispersion layer (14) with the near-infrared absorption dye (11) and the ultraviolet absorption dye (12) dispersed in a resin matrix is formed on one side of the near-infrared absorption glass substrate (13). In addition, FIG. 1(*b*) discloses a structure where the dye dispersion layer (14*a*) with the near-infrared absorption dye (11) dispersed in a resin matrix is formed on one side of the near-infrared absorption glass substrate (13) and discloses a structure where the dye dispersion layer (14*b*) with the ultraviolet absorption dye (12) dispersed in a resin matrix is formed on the other side of the near-infrared absorption glass substrate (13).

A polymer resin forming the resin matrix can easily disperse the near-infrared absorption dye and the ultraviolet absorption dye and can be selected within a range without deteriorating the optical characteristics. One or more from the group consisting of, for example, a polyester resin, a polycarbonate resin, an acrylic resin, a polyolefin resin, a cyclic olefin resin, a polyimide resin, a polyamide resin and a polyurethane resin may be selected as the polymer resin.

As the optical component according to the present invention comprises the near-infrared glass substrate (13) with the optical characteristics stated above and the dye dispersion layer (14, 14*a*, 14*b*), it can provide an optical filter appropriate for an image sensor and not cause a color difference. In one embodiment, the near-infrared absorption dye (11) can have the maximum absorption region in 690 nm to 750 nm range and the ultraviolet absorption dye (12) can have the maximum absorption region in 350 nm to 410 nm wavelength range. Preferably, the near-infrared absorption dye (11) may have the maximum absorption region in 700 nm to 750 nm range and the ultraviolet absorption dye (12) may have the maximum absorption region in the 370 nm to 400 nm wavelength range.

In addition, the near-infrared absorption dye (11) can be, for example, a cyanine-based compound, a phthalocyanine-based compound, a naphthalocyanine-based compound, a porphyrin-based compound, a benzo porphyrin-based compounds, an indole-based compound, a triazine-based compound, a benzotriazole-based compound, a squarylium-based compound, an anthraquinone-based compound, a croconium-based compound, diimmonium-based compound and/or a dithiol metal complex compound, etc. As an example, the near-infrared absorption dye (11) may be represented by the following Formula 1.

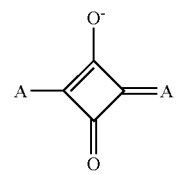

[Formula 1]

In Formula 1

Although A is an aminophenyl group; an indolyl methylene group; or an indolinyl group, two As have a structure forming a conjugation each other with a center of

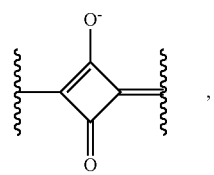 [SMILES: *C1=C([O-])C(=*)C1=O]

,

One or more of hydrogen existing in the aminophenyl group, the indolyl methylene group or the indolinyl are each independently, hydrogen, a halogen group, a hydroxy group, a cyano group, a nitro group, a carboxyl group, an alkyl group with a carbon number of 1 to 20, a cycloalkyl group with a carbon number of 3 to 20, an alkoxy group with a carbon number of 1 to 10, an aralkyl group with a carbon number of 7 to 20, a sulfonamide group or an amide group substituted or unsubstituted with the alkyl group with a carbon number of 1 to 4, a haloalkyl group with a carbon number of 1 to 4 or an aralkyl with a carbon number of 7 to 20 and;

Specifically, Formula 1 can be any one of compounds represented by Formula 1a to Formula 1c.

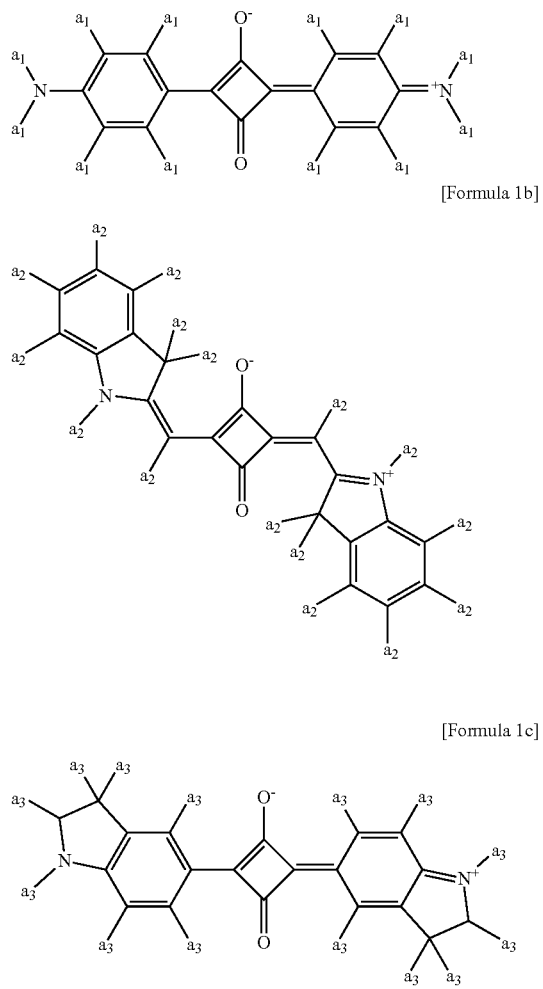

In Formula 1a to Formula 1c, $a_1$, $a_2$, and $a_3$ are each independently hydrogen, a halogen group, a hydroxyl group, a cyano group, a nitro group, a carboxy group, an alkyl group with a carbon number of 1 to 10, a cycloalkyl group with a carbon number of 3 to 10, an alkoxy group with a carbon number of 1 to 6, an aralkyl group with a carbon number of 7 to 20, a sulfonamide group or an amide group substituted or unsubstituted with the alkyl group with a carbon number of 1 to 4, a haloalkyl group with a carbon number of 1 to 4 of or an aralkyl group with a carbon number of 7 to 20.

<Ultraviolet Absorption Dye>

The ultraviolet absorption dye (12) may be represented by the following Formula 2.

$R_1$ to $R_3$ are each independently represented by hydrogen, a cyano group or the following Formula 2-a,

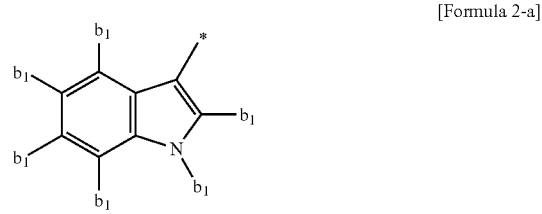

In Formula 2-a, $b_1$ are each independently hydrogen, an alkyl group with a carbon number of 1 to 20, a cycloalkyl group with a carbon number of 3 to 20, an alkoxy group with a carbon number of 1 to 10, an aralkyl group with a carbon number of 7 to 20 or an aryl group with a carbon number of 6 to 18, $R_4$ is represented by hydrogen, a cyano group, an amino group or the following Formula 2-b,

in Formula 2-b, $b_2$ is hydrogen, an alkyl group with a carbon number of 1 to 18, or an amino group.

One or more hydrogen of $R_1$ to $R_4$ of Formula 2 are each independently substituted or unsubstituted with one selected from the group consisting of an alkyl group with a carbon number of 1 to 6, an alkenyl group with a carbon number of 1 to 6, an alkoxy group with a carbon number of 1 to 6, and an aryl with a carbon number of 6 to 20, a heteroaryl group with a carbon number of 2 to 20, an aryloxy group with a carbon number of 6 to 20, an arylthio group with a carbon number of 6 to 20, an alkoxycarbonyl group with a carbon number of 1 to 6, a halogen group, a cyano group, a nitro group, a hydroxyl group and a carboxy group.

The amount of combining the near-infrared absorption dye (11) and the ultraviolet absorption dye (12) can be in a range of 2.5 to 5.5 parts by weight, specifically 2.6 to 5.0 parts by weight, 2.8 to 4.5 parts by weight or 2.9 to 4.0 parts by weight with respect to 100 parts by weight of the dispersion layer (14, 14a, 14b). Also, the amount ratio of the ultraviolet absorption dye (12) as to the near-infrared absorption dye (11) may be in a range of 0. 5 to 3.0 as a weight ratio, specifically in 0.6 to 2.9, 1.0 to 2.8 or 1.2 to 2.7 weight ratio range.

As the present invention of the optical component includes the dye dispersion layer (14, 14a, 14b) containing the near-infrared absorption dye (11) and the ultraviolet absorption dye (12) which are selected from various kind or types of dyes having the maximum absorption region within the wavelength range stated above and being mixed as a predetermined amount and amount ratio as stated above, it is possible to realize an optical filter which can provide a brighter image when the image is captured by providing a high transmission rate in the visible light range at the same time while not causing color difference by suppressing the short-wavelength shift of the visible light transmission rate curve.

In another embodiment, for the optical component according to the present invention, a longest wavelength ($\lambda$_cut-on) where the transmission rate is 50% under 430 nm wavelength range exists in 410 nm to 420 wavelength range and a shortest wavelength ($\lambda$_cut-off) where the transmission rate is 50% above 565 nm wavelength range may exist in 625 nm to 645 nm wavelength range. Since the $\lambda$_cut-on value and the $\lambda$_cut-off value exist in the predetermined wavelength range, it may be possible to obtain a high quality image sufficiently reproducing a unique color of a subject when it is used in combination with a commercially available image sensor. When the $\lambda$_cut-on value is smaller than the value of the range, blue color may be excessively emphasized or when the value of $\lambda$_cut-on is larger than the value of the range, the blue color may be insufficient. Also, when the $\lambda$_cut-off value is smaller than the value of the range, the red color is insufficient or when it is larger than the value of the range, there is a concern of obtaining an image with red color excessively emphasized.

Further, the optical component has a feature of the average transmission rate of 87% or more in 430 nm to 565 nm wavelength range. If the average transmission rate is less than 87%, it is difficult to clearly reproduce the shape of the subject when the image is taken in a low light environment.

In addition, in one embodiment, the optical component may have the average transmission rate of 25% or more in 800 nm to 1,200 nm wavelength range and a transmission rate of 50% or more in 1,200 nm wavelength. Specifically, the optical component may have the average transmission rate of 26% or more, 29% or more or 32% or more in 800nm to 1,200nm wavelength range, and it may have the transmission rate of 51% or more or 55% or more in 1,200 nm wavelength range. The optical component according to the present invention may cut off sufficiently with respect to the light in 700 nm to 750 nm wavelength range which affects an image of an image capturing device by forming a first transmission cut-off region. However, as to the light above 750 nm wavelength range, it is possible to selectively cut off the light with respect to 400 nm or under and/or 750 nm or above wavelength range by forming a selective wavelength reflecting layer on one or both sides of the optical component while transmitting a certain level of light. Through this, when the optical component according to the present invention is applied to the image capturing device, a bright image can be obtained through the imaging device by providing a high transmission rate in the visible light region while suppressing the occurrence of color difference caused by an incident angle increment.

In addition, the optical component can effectively reduce the shift effect of the transmission spectrum with respect to the angle of the incident light. In one embodiment, in 400 nm to 410 nm wavelength range, the optical component may have 5 nm or less, or 3 nm or less or practically 2 nm or less of an absolute value of the difference between a wavelength ($\lambda$_T30%@0° where the transmission rate is 30% under the incident angle of 0° condition and a wavelength ($\lambda$_T30%@40° where the transmission rate is 30% under the incident angle of 40° condition. Through this, the optical component according to the present invention suppresses the short-wavelength shift of the transmission rate curve with respect to the incident angle increment in the visible light region and suppresses the change in the integral value (area) of the transmission rate in the visible light region 1% or less and thereby it is possible to provide an optical filter that significantly reduces the color change due to an incident angle increment.

<Optical Filter>

The present invention also provides an optical filter comprising the above-described optical component.

The optical filter may be a structure comprising a selective wavelength reflecting layer formed on one or both sides of the optical component. Through this, the optical filter may satisfy the following conditions (i) and (ii) when the transmission spectrum is measured by using spectrophotometer under the incident angle of 0° condition in 300 nm to 1,200 nm wavelength range.

(i) The shortest wavelength ($\lambda$_cut-off) with a transmission rate of 50% in the wavelength range longer than the 565 nm wavelength range is in 630 nm to 655 nm and (ii) an average transmission rate is 93% or more in 430 nm to 565 nm wavelength range.

This means it is possible for the optical filter according to the present invention to be compatibly used with a commercially available image sensor and to provide a clear and bright image in a low light image capturing environment by showing a high transmission rate with respect to the light in the visible light region.

The optical filter according to the present invention can selectively cut off by reflecting the light in a pre-determined wavelength range which is not cut off by absorption with forming a selective wavelength reflecting layer on one or both sides of the optical component. For example, it can selectively cut off the near-infrared light in 700 nm or above wavelength range and the ultraviolet light in 400 nm or under wavelength range.

The $\lambda$_cut-off may be preferably in the range of 632 nm to 653 nm and more preferably in the range of 635 nm to 650 nm. In addition, the average transmission rate may be preferably 93.5% or more and more preferably 94% or more.

In one embodiment, the optical filter can satisfy the following Equation 2.

$$|(A-B)/A|*100 \leq 1\%  \quad \text{[Equation 2]}$$

In Equation 2, A represents the integral value of the transmission rate when the transmission rate curve of the optical filter is measured at a 0° incident angle condition using a spectrophotometer in a wavelength range of 380 nm to 780 nm, B shows the integral value of the transmission rate when the transmission curve of the optical filter is measured under a 40° incident angle condition using a spectrophotometer in a wavelength range of 380 nm to 780 nm. The integral value of the transmission rate is a factor related to the amount of light reaching the image sensor and it is preferable that the change of the integral value is small despite the incident angle change.

The optical filter according to the present invention can effectively suppress the short wavelength shift of the visible light transmission rate curve even if the incident angle of the incident light increases by 40° thereby preventing the occurrence of the color difference. For example, as shown in Equation 2, the difference between the integration value of the transmission rate with respect to the incident light of the incident angle of 0° condition and the integration value of the transmission rate with respect to the incident light of the incident angle of 40° condition may be 1% or less, preferably 0.5% or less and more preferably 0.2% or less.

Figure 2:
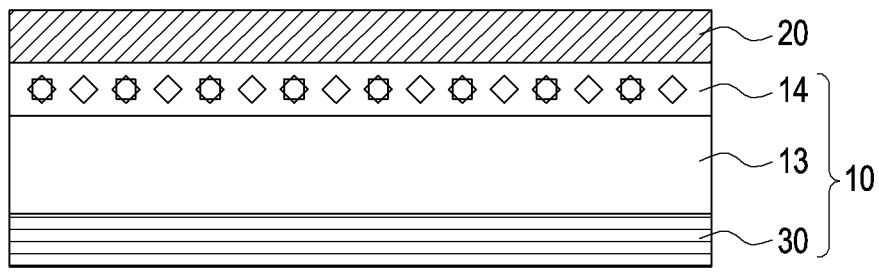
FIG. 2 is a cross-sectional view disclosing a structure of an optical filter according to another embodiment of the present invention.
Figure 2:
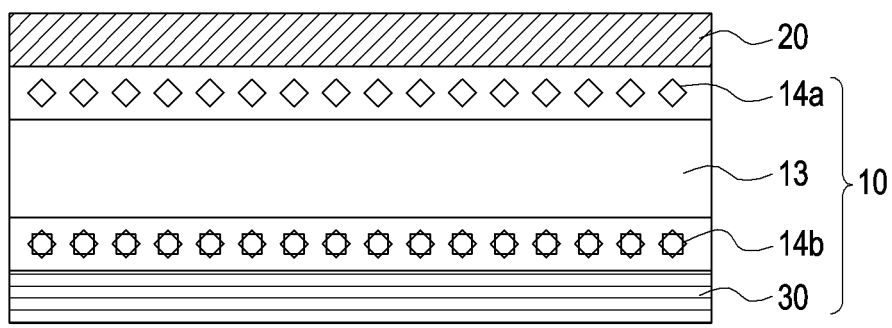
Figure 2:
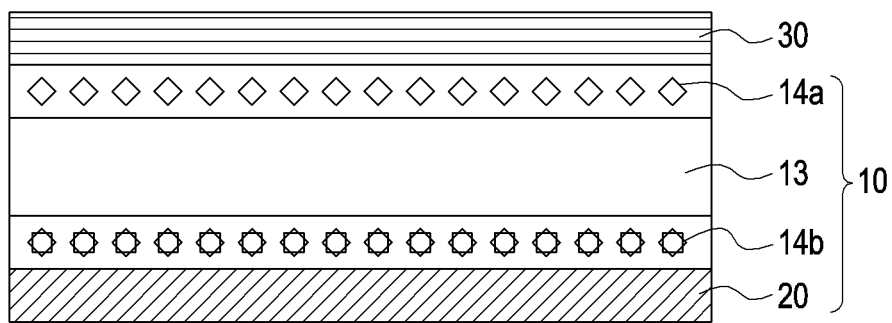

FIG. 2 is a cross-sectional view disclosing a structure of the optical filter according to one embodiment of the present invention. In FIG. 2, the optical filter according to the present invention comprises an optical component (10) including a near-infrared absorption glass substrate (13) and a dye dispersion layer (14, 14a, 14b) wherein a near-infrared and/or a ultraviolet absorption dye are/is dispersed on one or both sides of the near-infrared absorption glass substrate and a selective wavelength reflecting layer (20 and 30) placed on both sides of the optical component (10).

Since the near-infrared absorption glass substrate (13), the dye dispersion layers (14, 14a, 14b) and the optical component (10) were mentioned above, overlapping description shall be omitted.

As for the optical filter according to the present invention, the selective wavelength reflecting layer (20 and 30) may either selectively reflect light in a pre-determined wavelength range among the incident light to the optical filter or provide a function of an anti-reflection layer preventing reflection to increase the light transmission in the visible light region. For example, it can perform the role to reflect light in 700 nm to 1,200 nm wavelength range and in 300 nm to 400 nm wavelength range thereby preventing the light in the wavelength range entering to an image sensor and to prevent reflection of the visible light region in 400 nm to 700 nm wavelength range thereby increasing the amount of the incident light in the wavelength range to the image sensor. In other words, the selective wavelength reflecting layer (20 and 30) can perform the role as a near-infrared reflecting layer reflecting the near-infrared, a ultraviolet reflecting layer reflecting the ultraviolet and/or an anti-reflection layer preventing reflection of the visible light.

In one embodiment, the optical filter comprises a first selective wavelength reflecting layer (20) formed on a first main surface of the optical component and a second selective wavelength reflecting layer (30) formed on a second main surface of the optical component. The first selective wavelength reflecting layer (20) can perform a role as an anti-reflection layer preventing reflection in a wide wavelength range including the visible light region, the ultraviolet region which has shorter wavelength than the end of the short wavelength in the visible light region and the near-infrared region which has longer wavelength than the end of the long wavelength in the visible light region, and the second selective wavelength reflecting layer (30) can perform a role to transmit light in the visible light region with the high transmission rate of 95% or higher and selectively to reflect light in the ultraviolet and the near-infrared region. On the contrary, the first selective wavelength reflecting layer (20) can perform a role to selectively reflect the light in the ultraviolet region and the second selective wavelength reflecting layer (30) can perform a role to selectively reflect the light in the near-infrared region. Although it has been explained as an example where the first and the second selective wavelength reflecting layers performing their respective roles are placed on the first and the second main surface, respectively, it is fine to place the second wavelength reflecting layer (30) on the first main surface and to place the first selective wavelength reflecting layer (20) on the second main surface.

As one example, the selected wavelength reflecting layers (20 and 30) can have a dielectric multilayered structure wherein a high refractive index layer and a low refractive index layer are alternately stacked and further can have an aluminum deposition layer; a precious metal thin film; or a resin film where one or more fine particles from an indium oxide and tin oxide are dispersed. For example, the selected wavelength reflecting layers (20 and 30) can be a structure where a dielectric layer (not disclosed) having a first refractive index and a dielectric layer (not disclosed) having a second refractive index are alternately stacked and the difference of the refractive index between the dielectric layer having the first refractive index and the dielectric layer having the second refractive index can be 0.2 or more; 0.3 or more; or 0.2 to 1.0.

In addition, as for the selected wavelength reflecting layer (20 and 30) of the high refractive index layer and a low refractive index layer, although it is not limited to a particular one if the difference of the refractive index between the high refractive index layer and the low refractive index layer is within the range stated above, specifically the high refractive index layer can include one of more selected from a group of titanium oxide, aluminum oxide, zirconium oxide, tantalum pentoxide, niobium pentoxide, lanthanum oxide, yttrium oxide, zinc oxide, zinc sulfide and indium oxide with the refractive index of 1.6 to 2.4 and the indium oxide can further include small amount of titanium oxide, tin oxide or cerium oxide, etc. Furthermore, the low refractive index layer can include one or more selected from a group of silicon dioxide, lanthanum fluoride, magnesium fluoride, and hexafluoride aluminate sodium (cryolite, $Na_3AlF_6$) with the refractive index of 1.3 to 1.6.

Through this, the optical filter according to the present invention limits the range of transmitted light to the visible light region and when the optical filter is applied to the image capturing device, it is possible to have an image realization which does not cause a color difference as to the incident angle increment, is bright and reproduces the original color sufficiently.

<Image Capturing Device>

Furthermore, in one embodiment the present invention provides an image capturing device including the optical filter.

The image capturing device according to the present invention includes the optical filter and exhibits a high transmission rate with respect to light having a wavelength in the visible light region. In addition, by including the optical filter having a high average transmission rate of 93% or more in the visible light region and a suppressed short wavelength shift of the visible light transmission curve despite the incident angle of a light source is increased to 40°, it is possible to have an image realization which does not cause a color difference with respect to a position on the image taken by the image capturing device, is bright and reproduces the original color sufficiently.

Therefore, the image capturing component can be usefully applied to an electronic device where the image capturing device is adapted, for example, a digital still camera, a portable camera, a digital video camera, a PC camera, a surveillance camera, an automobile camera, a portable information terminal, a personal computer, a video game, a medical device, a USB memory, a portable game machine, a fingerprint authentication system and a digital music player, etc.

Below, the present invention will be described in more detail by preparation examples, embodiments and experimental examples.

However, the preparation example, the embodiment and the experimental example stated below are only examples for the present invention, thus the contents of the present invention is not limited to the preparation example, the embodiment and the experimental example stated below.

A near-infrared absorption glass substrate (13) used in the preparation example and the comparative example and the embodiment and the comparative example is the one prepared by polishing a commercially available BG61 (Product Name, Schott Company, Germany) Each near-infrared glass substrate having different thickness was prepared by differentiating the polishing thickness and its thickness was measured. Specifically, as for the near-infrared absorption glass substrate having its width and length of 77 nm respectively, the thickness was defined by an arithmetic average value from the thickness measurement of five points measured at the total of five points including one in the center and four points 50 mm apart from the center position to the diagonal direction using a fine precision micrometer (Mitutoyo Company, Product Name: MDH-25M). As shown in Table 1, the thickness of the near-infrared absorption glass substrate was respectively 0.145 mm, 0.165 mm, 0.190 mm and 0.210 mm.

Figure 3:
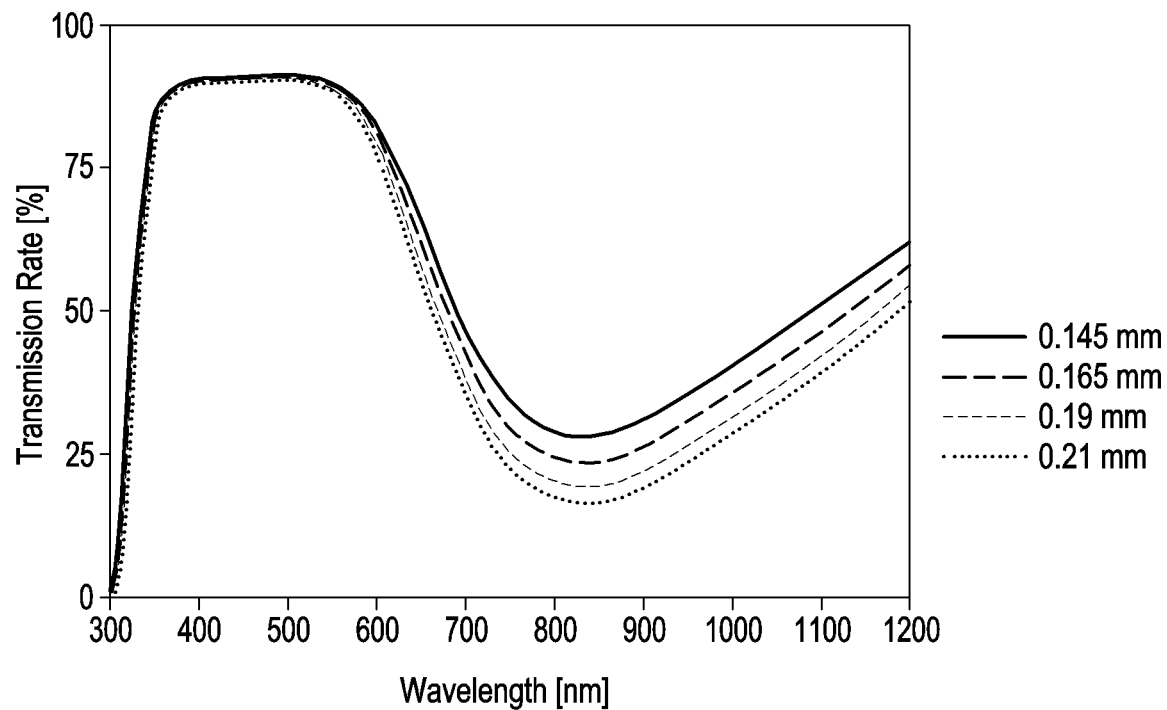
FIG. 3 is a graph disclosing a transmission rate curve with respect to the near-infrared absorption glass substrate.

The optical characteristics of the near-infrared absorption glass substrate were investigated. Specifically, as for each near-infrared absorption glass substrate, the transmission rate with respect to 300 nm to 1,200 nm wavelength range was measured using the spectrophotometer (PerkinElmer Company, Product Name: LAMBDA 750). From the measurement result, the average transmission rate of the visible light in 430 nm to 565 nm wavelength range and a shortest wavelength (Cut-Off T50%) where the transmission rate in a longer wavelength range than 565 nm wavelength is 50% are calculated and then appear in Table 1 together. In addition, the transmission rate curve with respect to the near-infrared absorption glass substrate described in Table 1 below is disclosed in FIG. 3.

TABLE 1

| Thickness [mm] | 0.145 | 0.165 | 0.190 | 0.210 |
|---|---|---|---|---|
| Visible Light Average Transmission Rate [%] | 90.7 | 90.5 | 90.3 | 90.1 |
| Cut-off T50% [nm] | 690.0 | 679.4 | 668.9 | 662.0 |

From the results of Table 1, it can be known that it is possible to obtain the optical characteristics having the average transmission rate of 90% or more for the visible light and the Cut-Off T50% of 660 nm to 690 nm using the 0.140 to 0.220 mm thick near-infrared absorption glass containing copper II ions.

Preparation Examples 1 to 6

As a preparation example according to the present invention, an optical component having a first and a second transmission cut-off region was prepared as follows.

The near-infrared absorption dye, N1 (H. W. SANDS CORP., USA), as expressed by Formula 1 and having a maximum absorption region in 710±5 nm wavelength range, the near-infrared absorption dye, N2 (H. W. SANDS CORP., USA), as expressed by Formula 1 and having a maximum absorption region in 740±5 nm wavelength range, and the ultraviolet absorption dye, U1 (H. W. SANDS CORP., USA), as expressed by Formula 2 and having a maximum absorption region in 380±5 nm wavelength range are mixed with the reference to the resin 100 parts by weight by the amount as the following Table 2. In this case, polymethyl methacrylate (PMMA) resin was used as for the resin and cyclohexanone was used as for the organic solvent. Then, the absorption solution was prepared by stirring with an agitator for 24 hours. The optical component where a dye dispersion layer is formed on the cross-section as shown in FIG. 1(a) was prepared by depositing the prepared absorption solution of Table 1 on the cross-section of the near-infrared absorption glass substrate having 0.145 mm thickness and hardening at 160° C. for 120 minutes.

TABLE 2

| | First Transmission Cut-Off Region | | | | Second Transmission Cut-Off Region | | | | |
|---|---|---|---|---|---|---|---|---|---|
| | N1 parts by weight | N2 parts by weight | W1 [nm] | OD1 | U1 parts by weight | W2 [nm] | OD2 | N1 + N2 + U1 parts by weight | U1/ (N1 + N2) |
| Preparation Example 1 | 0.88 | 0.32 | 8.3 | 1.0 | 1.93 | 10.3 | 0.28 | 3.12 | 1.61 |
| Preparation Example 2 | 0.88 | 0.32 | 8.3 | 1.0 | 2.62 | 40.5 | 0.37 | 3.81 | 2.19 |
| Preparation Example 3 | 0.88 | 0.97 | 18.9 | 1.0 | 1.87 | 12.2 | 0.25 | 3.71 | 1.01 |
| Preparation Example 4 | 0.88 | 0.97 | 18.9 | 1.0 | 2.46 | 39.0 | 0.32 | 4.30 | 1.34 |
| Preparation Example 5 | 0.88 | 1.06 | 20.5 | 1.0 | 1.91 | 16.9 | 0.25 | 3.84 | 0.99 |
| Preparation Example 6 | 0.88 | 1.06 | 20.5 | 1.0 | 2.56 | 41.9 | 0.32 | 4.49 | 1.32 |

For each optical component prepared according to Preparation Examples 1 to 6 according to the present invention, a transmission rate curve and an absorbance curve were measured at 0° incident angle using a spectrophotometer in the wavelength range of 300 nm to 1,200 nm. From the measurement result, the wavelength width (W1) of the first transmission cut-off region representing the transmission rate of 1% or less in 565 nm or above and the wavelength width (W2) of the second transmission cut-off region representing the transmission rate of 25% or less in 430 nm or below were calculated. In addition, the maximum value of absorbance (OD2) of the second transmission cut-off region was calculated when the absorbance curve is normalized to be 1 (one) for the maximum value of absorbance (OD1) of the first transmission cut-off region. The results are stated together in Table 2. In addition, the absorbance curve for each of the optical component according to the preparation examples 3 to 6 as stated in Table 2 above is disclosed in FIG. 4. With the reference to Table 2 and FIG. 4, when the amount of N1, N2 and U1 was changed to be in the range of 0.99 to 2.19 weight ratio for the amount ratio (U1/(N1+N2)) of the ultraviolet absorption dye with respect to the near-infrared absorption dye with a near infrared absorbing dye while the combined amount (N1+N2+U1) of the near infrared absorbing dye, N1 and N2 and the ultraviolet absorbing dye, U1 being in 3.12 to 4.49 parts by weight range, it is known to be possible to control the wavelength width (W1) of the first transmission cut-off region being in 8.3 nm to 20.5 nm range by controlling the amount of N1 and N2 and to control the wavelength width (W2) of the second transmission cut-off region being in 10.3 nm to 41.9 nm range by controlling the amount of U1. In addition, it is known to be possible to control OD2 value being in 0.25 to 0.37 range by controlling the amount ratio for the ultraviolet absorption dye with respect to the combined amount of the near-infrared absorption dye.

Preparation Examples 7 to 12

Except for the near-infrared absorption glass substrate having 0.165 mm thickness and the amount of the near-infrared absorption dye N1 having the maximum absorption region at 710±5 nm, the near-infrared absorption dye N2 having the maximum absorption region at 740±5 nm, and the ultraviolet absorption dye U1 having the maximum absorption region at 380±5 nm in Table 1 above, the optical components for Preparation Examples 7 to 12 were prepared with substantially the same method as the Preparation Examples 1 to 6 as stated above. The amount of the near-infrared absorption dye and the ultraviolet absorption dye is stated as following Table 3 for this case.

The wavelength width (W1) of the first transmission cut-off region, the wavelength width (W2) of the second transmission cut-off region and the absorbance value for the optical components according to Preparation Examples 7 to 12 which were measured by substantially the same method as the transmission rate and the absorbance measurement method for the optical components according to Preparation Examples 1 to 6 as stated above were calculated. The results are stated in Table 3 above. Referring to Table 3, when the amount of N1, N2 and U1 was changed to be in the range of 1.06 to 2.34 weight ratio for the amount ratio (U1/(N1+N2)) of the ultraviolet absorption dye with respect to the near-infrared absorption dye with a near infrared absorbing dye while the combined amount (N1+N2+U1) of the near infrared absorbing dye, N1 and N2 and the ultraviolet absorbing dye, U1 being in 3.05 to 4.35 parts by weight range, it is known to be possible to control the wavelength width (W1) of the first transmission cut-off region being in 8.6 nm to 21.3 nm range by controlling the amount of N1 and N2 and to control the wavelength width (W2) of the second transmission cut-off region being in 9.8 nm to 40.5 nm range by controlling the amount of U1. In addition, it is known to be possible to control OD2 value being in 0.26 to 0.37 range by controlling the amount ratio for the ultraviolet absorption dye with respect to the combined amount of the near-infrared absorption dye.

Preparation Examples 13 to 18

Except for the near-infrared absorption glass substrate having 0.190 mm thickness and the amount of the near-infrared absorption dye N1 having the maximum absorption region at 710±5 nm, the near-infrared absorption dye N2 having the maximum absorption region at 740±5 nm, and the ultraviolet absorption dye U1 having the maximum absorption region at 380±5 nm in Table 1 above, the optical components for Preparation Examples 13 to 18 were prepared with substantially the same method as the Preparation Examples 1 to 6 as stated above. The amount of the near-infrared absorption dye and the ultraviolet absorption dye is stated as following Table 4 for this case.

TABLE 3

| | First Transmission Cut-Off Region | | | | Second Transmission Cut-Off Region | | | | |
|---|---|---|---|---|---|---|---|---|---|
| | N1 parts by weight | N2 parts by weight | W1 [nm] | OD1 | U1 parts by weight | W2 [nm] | OD2 | N1 + N2 + U1 parts by weight | U1/ (N1 + N2) |
| Preparation Example 7 | 0.88 | 0.24 | 8.6 | 1.0 | 1.93 | 9.8 | 0.28 | 3.05 | 1.73 |
| Preparation Example 8 | 0.88 | 0.24 | 8.6 | 1.0 | 2.62 | 40.5 | 0.37 | 3.73 | 2.34 |
| Preparation Example 9 | 0.88 | 0.87 | 18.6 | 1.0 | 1.97 | 20.9 | 0.26 | 3.71 | 1.13 |
| Preparation Example 10 | 0.88 | 0.87 | 18.6 | 1.0 | 2.46 | 38.9 | 0.32 | 4.21 | 1.41 |
| Preparation Example 11 | 0.88 | 1.02 | 21.3 | 1.0 | 2.01 | 24.7 | 0.26 | 3.90 | 1.06 |
| Preparation Example 12 | 0.88 | 1.02 | 21.3 | 1.0 | 2.46 | 39.4 | 0.31 | 4.35 | 1.30 |

TABLE 4

| | First Transmission Cut-Off Region | | | | Second Transmission Cut-Off Region | | | | |
|---|---|---|---|---|---|---|---|---|---|
| | N1 parts by weight | N2 parts by weight | W1 [nm] | OD1 | U1 parts by weight | W2 [nm] | OD2 | N1 + N2 + U1 parts by weight | U1/ (N1 + N2) |
| Preparation Example 13 | 0.88 | 0.19 | 10.0 | 1.0 | 1.93 | 9.9 | 0.28 | 3.00 | 1.80 |
| Preparation Example 14 | 0.88 | 0.19 | 10.0 | 1.0 | 2.46 | 37.0 | 0.34 | 3.53 | 2.30 |
| Preparation Example 15 | 0.88 | 0.77 | 18.8 | 1.0 | 2.01 | 23.5 | 0.26 | 3.66 | 1.22 |
| Preparation Example 16 | 0.88 | 0.77 | 18.8 | 1.0 | 2.36 | 36.5 | 0.30 | 4.01 | 1.43 |
| Preparation Example 17 | 0.88 | 0.97 | 22.3 | 1.0 | 2.07 | 27.6 | 0.26 | 3.91 | 1.12 |
| Preparation Example 18 | 0.88 | 0.97 | 22.3 | 1.0 | 2.36 | 37.1 | 0.29 | 4.20 | 1.28 |

The wavelength width (W1) of the first transmission cut-off region, the wavelength width (W2) of the second transmission cut-off region and the absorbance value for the optical components according to the Preparation Examples 13 to 18 which were measured by substantially the same method as the transmission rate and the absorbance measurement method for the optical components according to the Preparation Examples 1 to 6 as stated above were calculated. The results are stated in Table 4 above. Referring to Table 4, when the amount of N1, N2 and U1 was changed to be in the range of 1.12 to 2.30 weight ratio for the amount ratio (U1/(N1+N2)) of the ultraviolet absorption dye with respect to the near-infrared absorption dye with a near infrared absorbing dye while the combined amount (N1+N2+U1) of the near infrared absorbing dye, N1 and N2 and the ultraviolet absorbing dye, U1 being in 3.00 to 4.20 parts by weight range, it is known to be possible to control the wavelength width (W1) of the first transmission cut-off region being in 10.0 nm to 22.3 nm range by controlling the amount of N1 and N2 and to control the wavelength width (W2) of the second transmission cut-off region being in 9.9 nm to 37.1 nm range by controlling the amount of U1. In addition, it is known to be possible to control OD2 value being in 0.26 to 0.34 range by controlling the amount ratio for the ultraviolet absorption dye with respect to the combined amount of the near-infrared absorption dye.

Preparation Examples 19 to 24

Except for the near-infrared absorption glass substrate having 0.210 mm thickness and the amount of the near-infrared absorption dye N1 having the maximum absorption region at 710±5 nm, the near-infrared absorption dye N2 having the maximum absorption region at 740±5 nm, and the ultraviolet absorption dye U1 having the maximum absorption region at 380±5 nm in Table 1 above, the optical components for Preparation Examples 19 to 24 were prepared with substantially the same method as Preparation Examples 1 to 6 as stated above. The amount of the near-infrared absorption dye and the ultraviolet absorption dye is stated as following Table 5 for this case.

TABLE 5

| | First Transmission Cut-Off Region | | | | Second Transmission Cut-Off Region | | | | |
|---|---|---|---|---|---|---|---|---|---|
| | N1 parts by weight | N2 parts by weight | W1 [nm] | OD1 | U1 parts by weight | W2 [nm] | OD2 | N1 + N2 + U1 parts by weight | U1/ (N1 + N2) |
| Preparation Example 19 | 0.88 | 0.10 | 9.9 | 1.0 | 1.97 | 13.8 | 0.28 | 2.94 | 2.03 |
| Preparation Example 20 | 0.88 | 0.10 | 9.9 | 1.0 | 2.56 | 39.2 | 0.36 | 3.53 | 2.63 |
| Preparation Example 21 | 0.88 | 0.58 | 17.2 | 1.0 | 2.07 | 25.7 | 0.27 | 3.52 | 1.42 |
| Preparation Example 22 | 0.88 | 0.58 | 17.2 | 1.0 | 2.36 | 36.0 | 0.31 | 3.82 | 1.62 |
| Preparation Example 23 | 0.88 | 0.77 | 20.1 | 1.0 | 2.07 | 26.8 | 0.26 | 3.72 | 1.25 |
| Preparation Example 24 | 0.88 | 0.77 | 20.1 | 1.0 | 2.26 | 33.9 | 0.29 | 3.91 | 1.37 |

The wavelength width (W1) of the first transmission cut-off region, the wavelength width (W2) of the second transmission cut-off region and the absorbance value for the optical components according to Preparation Examples 19 to 24 which were measured by substantially the same method as the transmission rate and the absorbance measurement method for the optical components according to Preparation Examples 1 to 6 as stated above were calculated. The results are stated in Table 5 above. Referring to Table 5, when the amount of N1, N2 and U1 was changed to be in the range of 1.25 to 2.63 weight ratio for the amount ratio (U1/(N1+N2)) of the ultraviolet absorption dye with respect to the near-infrared absorption dye with a near infrared absorbing dye while the combined amount (N1+N2+U1) of the near infrared absorbing dye, N1 and N2 and the ultraviolet absorbing dye, U1 being in 2.94 to 3.91 parts by weight range, it is known to be possible to control the wavelength width (W1) of the first transmission cut-off region being in 9.9 nm to 20.1 nm range by controlling the amount of N1 and N2 and to control the wavelength width (W2) of the second transmission cut-off region being in 13.8 nm to 39.2 nm range by controlling the amount of U1. In addition, it is known to be possible to control OD2 value being in 0.26 to 0.36 range by controlling the amount ratio for the ultraviolet absorption dye with respect to the combined amount of the near-infrared absorption dye.

Embodiment 1 to Embodiment 24

A first selective wavelength reflecting layer having a dielectric multilayered structure was formed on the first main surface of the optical component prepared in Embodiments 1 to 24 by alternately depositing $SiO_2$ and $Ti_3O_5$ using an electron beam evaporator (E-beam evaporator) at the temperature of 110±5° C. Later, an optical filter having a structure such as FIG. 2(a) according to Embodiments 1 to 24 was prepared by forming a second selective wavelength reflecting layer having a dielectric multilayered structure on the second main surface of the optical component by alternately depositing $SiO_2$ and $Ti_3O_5$ using an electron beam evaporator (E-beam evaporator) at the temperature of 110±5° C. The number of layer stacked of the stacked layers and the thickness for the first and the second selective wavelength reflecting layers for this case is stated in Table 6 as follows. Here, the thickness means a total thickness of each of the first and the second selective wavelength reflecting layers and its unit is in micrometer (μm).

TABLE 6

| First Selective Wavelength Reflecting Layer | | Second Selective Wavelength Reflecting Layer | |
|---|---|---|---|
| The Number of Layer Stacked | Thickness [μm] | The Number of Layer Stacked | Thickness [μm] |
| 7 | 0.3 | 41 | 5.0 |

In addition, the structure and the thickness for each of the first selective wavelength reflecting layer and the second selective wavelength layer adapted to Embodiments 1 to 24 is stated in Table 7 and Table 8, respectively.

TABLE 7

| Stacking Order | Material | Optical Thickness (QWOT) | Thickness [nm] |
|---|---|---|---|
| 1 | $SiO_2$ | 1.06 | 94.4 |
| 2 | $Ti_3O_5$ | 0.73 | 40.4 |

TABLE 7-continued

| Stacking Order | Material | Optical Thickness (QWOT) | Thickness [nm] |
|---|---|---|---|
| 3 | $SiO_2$ | 0.15 | 13.7 |
| 4 | $Ti_3O_5$ | 0.81 | 44.4 |
| 5 | $SiO_2$ | 0.44 | 39.4 |
| 6 | $Ti_3O_5$ | 0.22 | 12.1 |
| 7 | $SiO_2$ | 0.62 | 55.4 |

TABLE 8

| Stacking Order | Material | Optical Thickness (QWOT) | Thickness [nm] |
|---|---|---|---|
| 1 | $SiO_2$ | 1.03 | 87.9 |
| 2 | $Ti_3O_5$ | 0.17 | 8.8 |
| 3 | $SiO_2$ | 0.50 | 42.5 |
| 4 | $Ti_3O_5$ | 1.95 | 102.2 |
| 5 | $SiO_2$ | 1.83 | 156.4 |
| 6 | $Ti_3O_5$ | 1.68 | 88.0 |
| 7 | $SiO_2$ | 1.73 | 148.2 |
| 8 | $Ti_3O_5$ | 1.64 | 86.0 |
| 9 | $SiO_2$ | 1.70 | 145.6 |
| 10 | $Ti_3O_5$ | 1.61 | 84.4 |
| 11 | $SiO_2$ | 1.70 | 145.4 |
| 12 | $Ti_3O_5$ | 1.60 | 84.0 |
| 13 | $SiO_2$ | 1.70 | 144.9 |
| 14 | $Ti_3O_5$ | 1.60 | 84.0 |
| 15 | $SiO_2$ | 1.69 | 144.8 |
| 16 | $Ti_3O_5$ | 1.60 | 83.5 |
| 17 | $SiO_2$ | 1.70 | 145.5 |
| 18 | $Ti_3O_5$ | 1.62 | 84.7 |
| 19 | $SiO_2$ | 1.72 | 146.7 |
| 20 | $Ti_3O_5$ | 1.64 | 85.8 |
| 21 | $SiO_2$ | 1.75 | 149.4 |
| 22 | $Ti_3O_5$ | 1.70 | 89.2 |
| 23 | $SiO_2$ | 1.89 | 161.2 |
| 24 | $Ti_3O_5$ | 1.99 | 104.2 |
| 25 | $SiO_2$ | 2.09 | 179.0 |
| 26 | $Ti_3O_5$ | 2.00 | 104.6 |
| 27 | $SiO_2$ | 1.93 | 164.7 |
| 28 | $Ti_3O_5$ | 1.83 | 96.0 |
| 29 | $SiO_2$ | 1.91 | 163.2 |
| 30 | $Ti_3O_5$ | 1.98 | 103.6 |
| 31 | $SiO_2$ | 2.14 | 182.7 |
| 32 | $Ti_3O_5$ | 2.18 | 114.3 |
| 33 | $SiO_2$ | 2.22 | 189.8 |
| 34 | $Ti_3O_5$ | 2.22 | 116.4 |
| 35 | $SiO_2$ | 2.24 | 191.4 |
| 36 | $Ti_3O_5$ | 2.23 | 117.0 |
| 37 | $SiO_2$ | 2.22 | 189.7 |
| 38 | $Ti_3O_5$ | 2.18 | 114.0 |
| 39 | $SiO_2$ | 2.10 | 179.8 |
| 40 | $Ti_3O_5$ | 1.93 | 101.0 |
| 41 | $SiO_2$ | 0.96 | 81.6 |

Figure 5:
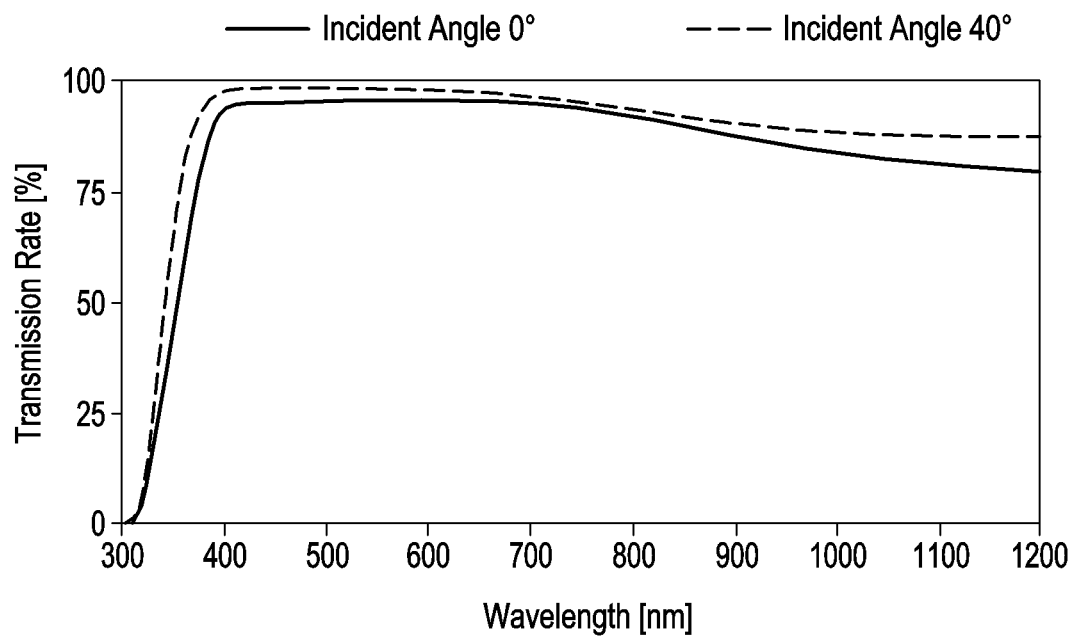
FIGS. 5 and 6 are graphs respectively disclosing spectral transmission rates of a first and a second selective reflective layer according to one embodiment of the present invention.

The first selective wavelength reflecting layer according to the present embodiments can perform a role to be an anti-reflection layer providing a high average transmission rate of 96% or above in 430 nm to 565 nm visible light region and providing the transmission rate of 75% or above even in a wide wavelength range covering some of the ultraviolet region having a shorter wavelength than the end of the short wavelength in the visible light region and a longer wavelength than the end of the long wavelength in the visible light region and the second selective wavelength reflecting layer can perform a role to be a ultraviolet and a near-infrared reflecting layer transmitting light in the visible light region with a high average transmission rate of 95% or above and selectively reflecting light in the ultraviolet region and the near-infrared region. On the contrary, the first selective wavelength reflecting layer can perform a role to selectively reflect the light in the ultraviolet region and the second selective wavelength reflecting layer can perform a role to selectively reflect the light in the near-infrared region. In any case, it is necessary to place the selective wavelength reflecting layer on the main surface of the optical component to be adapted to a high resolution camera module by sufficiently utilizing the spectral transmission rate characteristics of the optical component and it is preferable to sufficiently cut off the light in the ultraviolet region approximately 400 nm or below and the light in the near-infrared region approximately 700 nm or above without causing defect in image quality by placing the selective wavelength reflecting layer. The spectral transmission rates for the first selective wavelength reflecting layer disclosed in Table 7 and the second selective wavelength reflecting layer disclosed in Table 8 are illustrated in FIG. 5 and FIG. 6, respectively.

Figure 6:
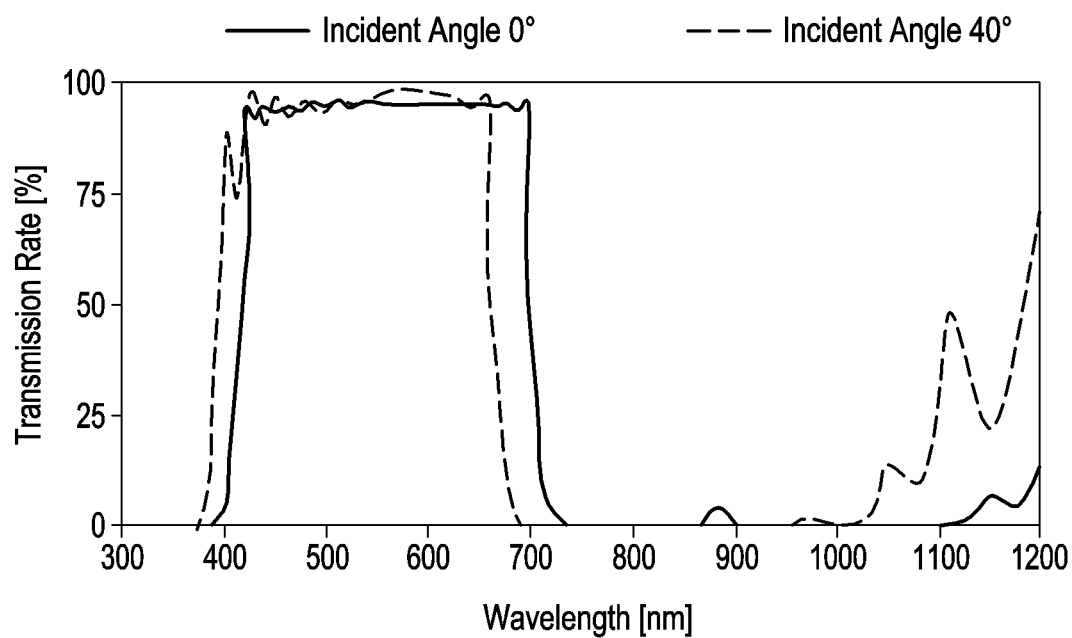
Figure 7:
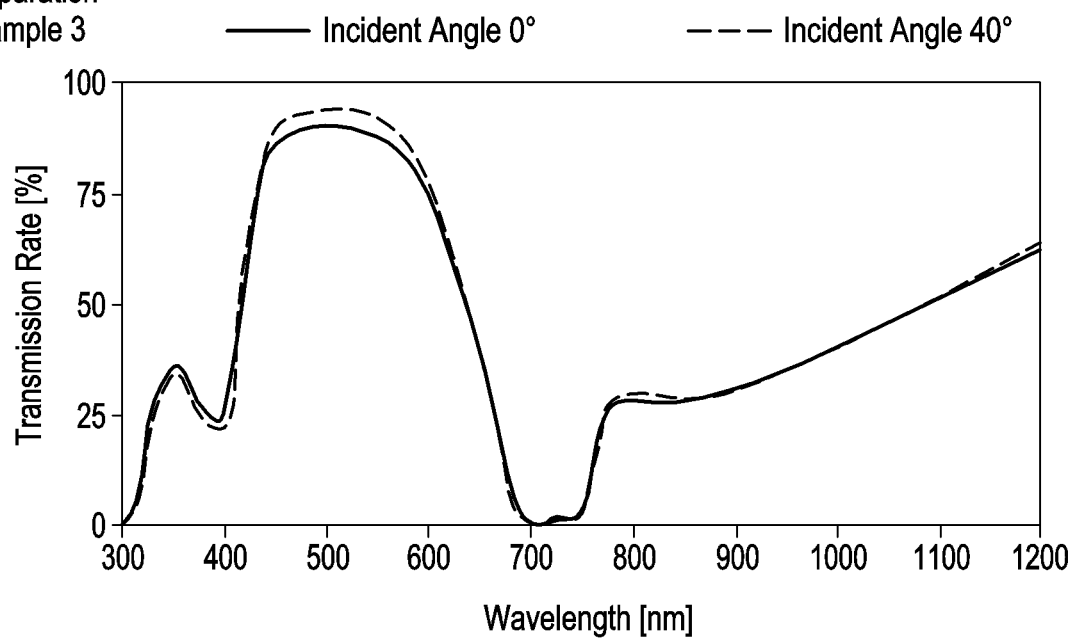
FIGS. 7 to 10 are graphs disclosing spectral transmission rates measured as to the optical component prepared by Preparation Example 3, Preparation Example 6, Comparative Preparation Example 7 and Comparative Preparation Example 19, respectively at 300 nm to 1,200 nm wavelength range.
Figure 8:
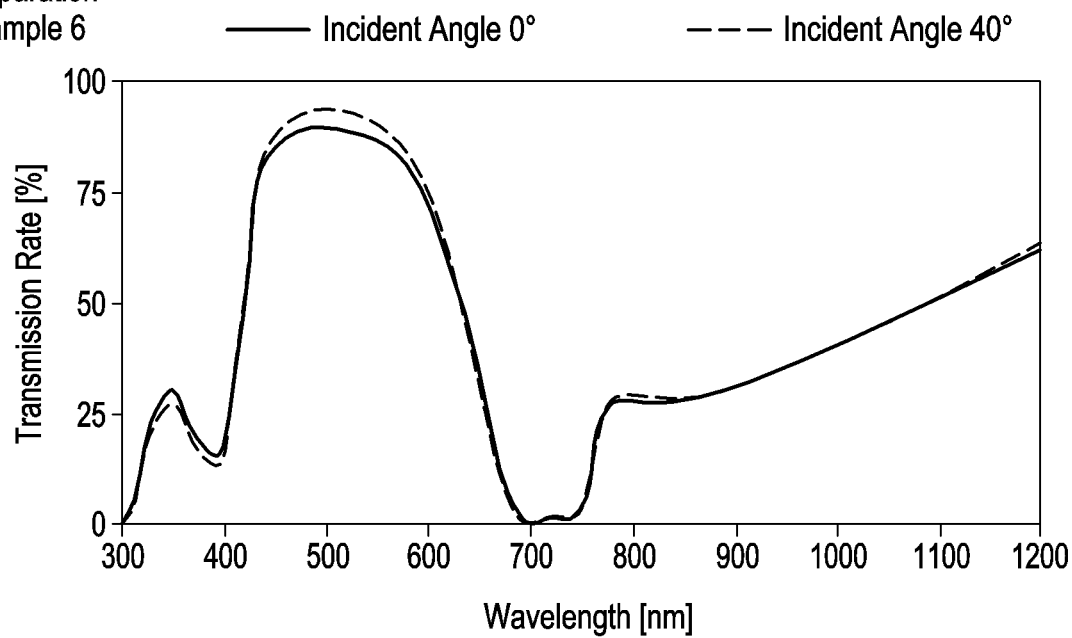
Figure 9:
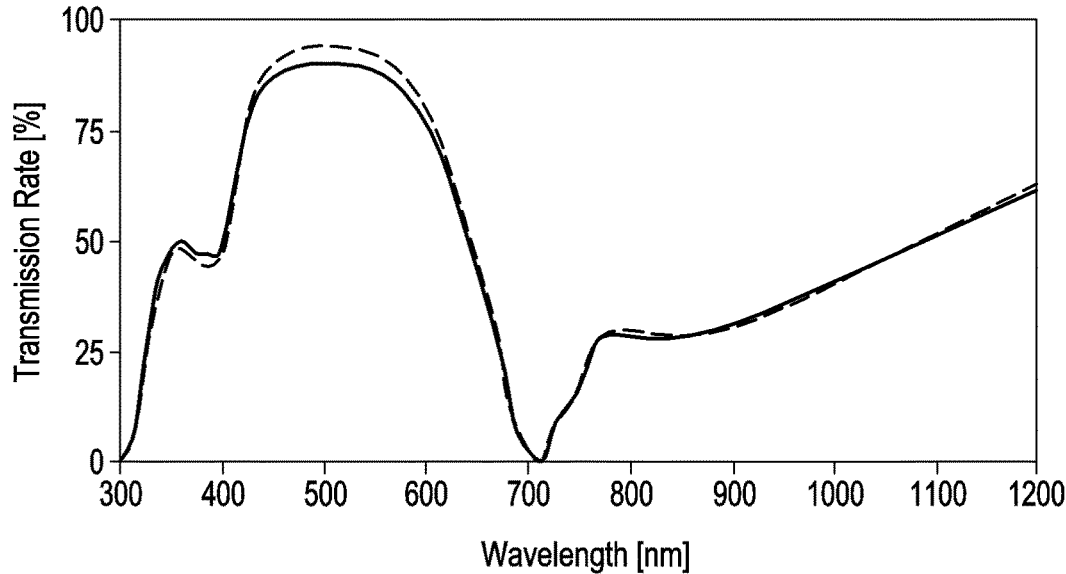
Figure 10:
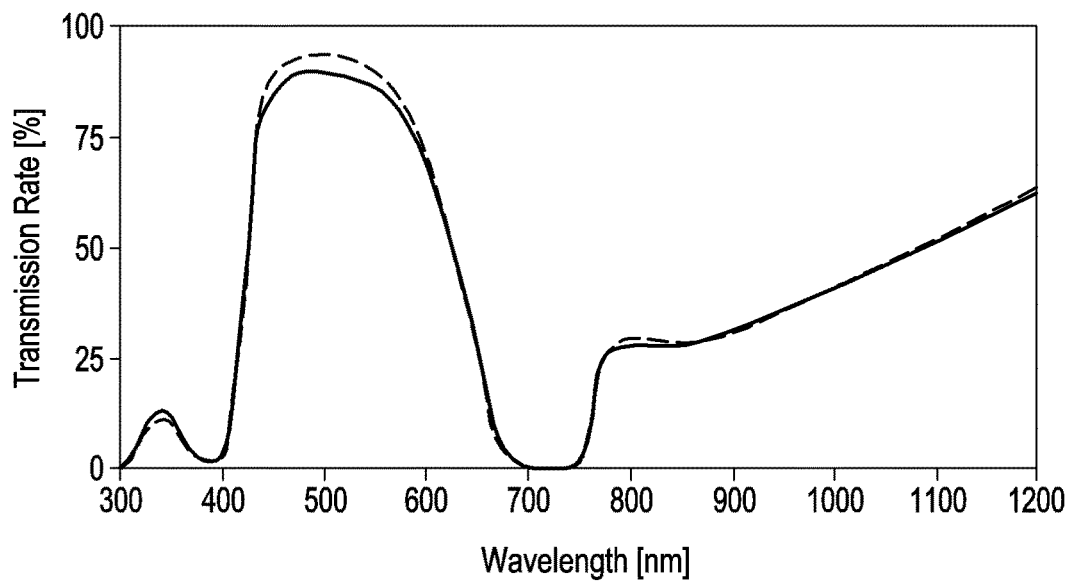
Figure 11:
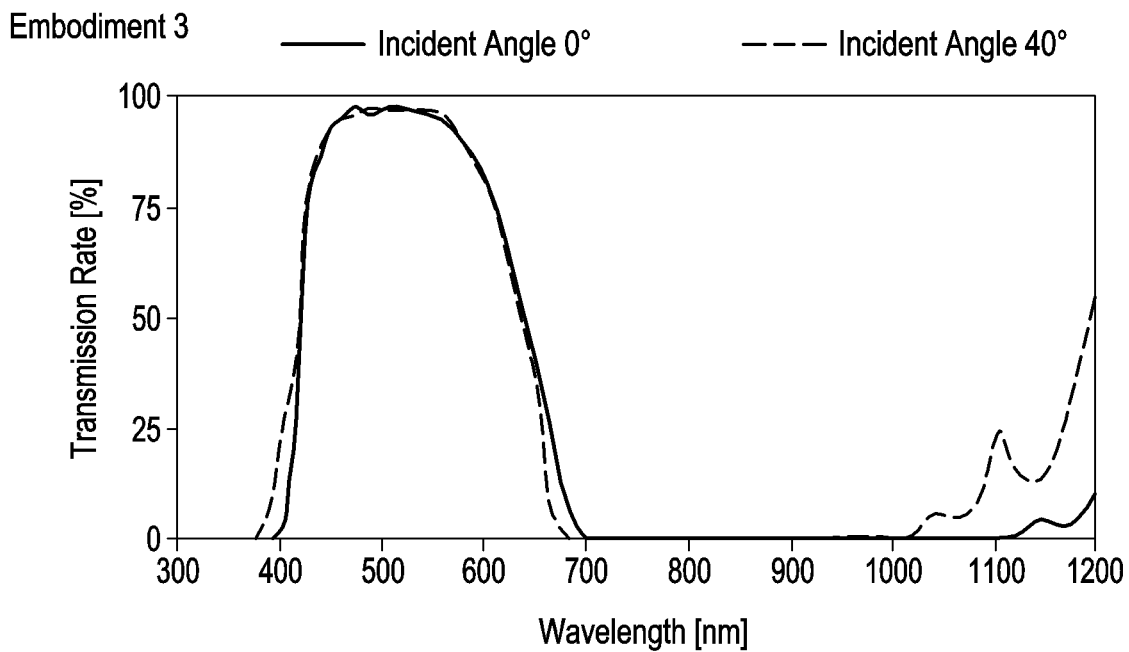
FIGS. 11 to 14 are graphs disclosing spectral transmission rates measured as to the optical filter prepared by Embodiment 3, Embodiment 6, Comparative Example 7 and Comparative Example 19, respectively at 300 nm to 1,200 nm wavelength range.
Figure 12:
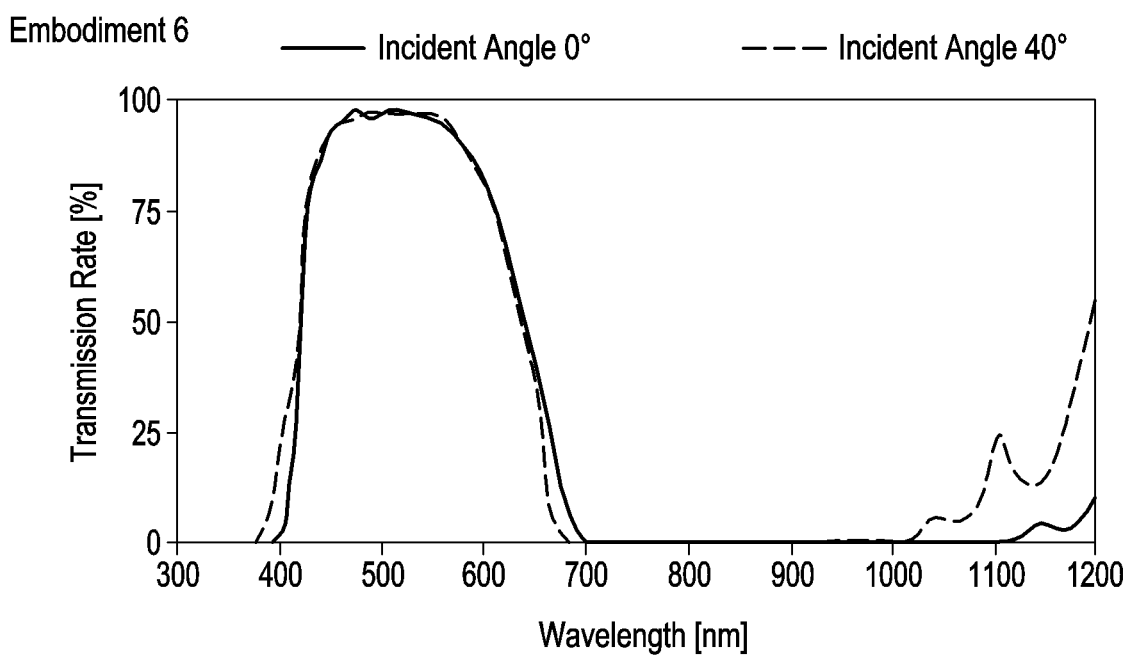
Figure 13:
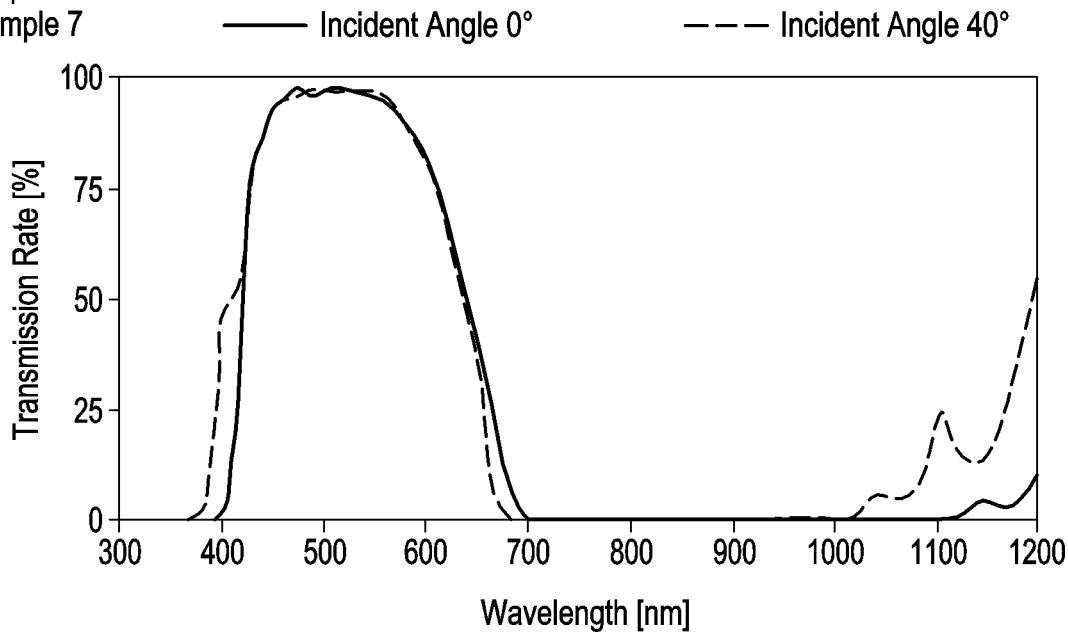
Figure 14:
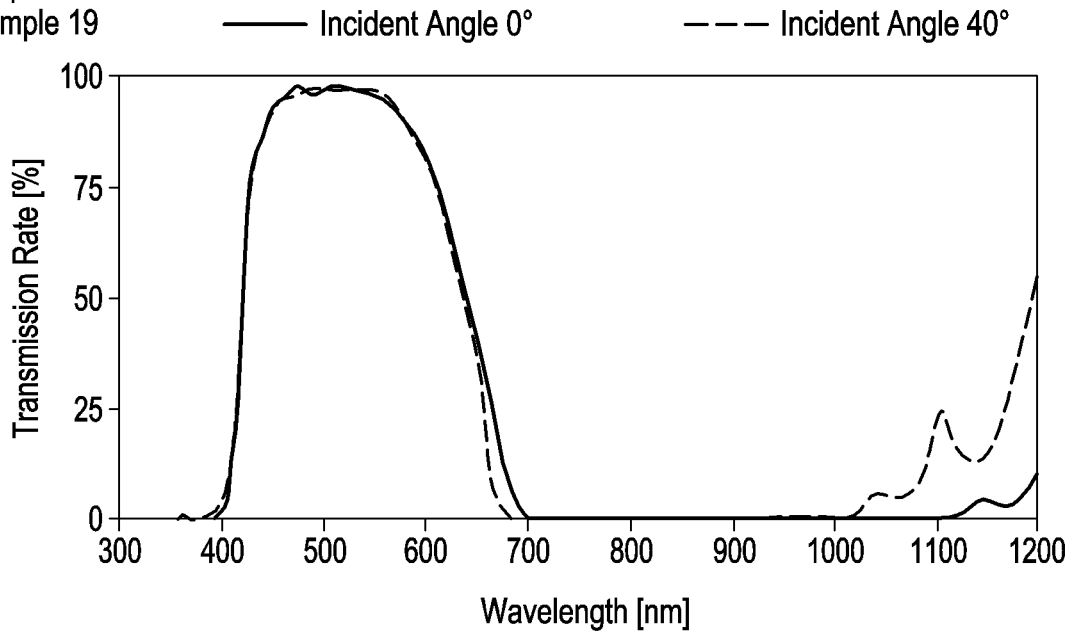

Referring FIG. 6, it is known that a transition region exists wherein the transmission rate at a certain wavelength interval (transition region A) between the visible light region and the near-infrared region and a certain wavelength interval (transition region B) between the ultraviolet region and the visible light region is abruptly changed. Further, as the incident angle is increased from 0° to 40°, the short wavelength shift phenomenon occurs wherein each transition region shifts toward to the short wavelength and thereby it is known that the short wavelength shift occurs by approximately 39 nm in the transition region A and approximately 22 nm in the transition region B with the reference to a wavelength which has the transmission rate of 50%. Such short wavelength shift may act as a major cause of color difference as the incident angle of the light source increases. However, as described above, as the transition regions A and B of the selective wavelength reflecting layer the first and second transmission cut-off region placed in the optical component according to the present invention are respectively superimposed and further as they are superimposed for the difference of the integral value of the transmission rate with respect to the incident angle increment of the visible light transmission rate curve to be less than 1%, it is possible to provide the optical filter substantially suppressing color difference.

Comparative Preparation Examples 1 to 19

Except for the amount of the near-infrared absorption dye N1 having the maximum absorption region at 710±5 nm, the near-infrared absorption dye N2 having the maximum absorption region at 740±5 nm, and the ultraviolet absorption dye U1 having the maximum absorption region at 380±5 nm, the optical components for Comparative Preparation Examples 1 to 19 were prepared with substantially the same method as the Preparation Examples 1 to 6 as stated above. The amount of the near-infrared absorption dye and the ultraviolet absorption dye is stated as following Table 9 for this case.

TABLE 9

| | First Transmission Cut-Off Region | | | | Second Transmission Cut-Off Region | | | | |
|---|---|---|---|---|---|---|---|---|---|
| | N1 parts by weight | N2 parts by weight | W1 [nm] | OD1 | U1 parts by weight | W2 [nm] | OD2 | N1 + N2 + U1 parts by weight | U1/ (N1 + N2) |
| Comparative Preparation Example 1 | 0.00 | 0.00 | — | — | 0.00 | — | — | 0.00 | — |
| Comparative Preparation Example 2 | 0.00 | 0.00 | — | — | 0.89 | — | — | 0.89 | — |
| Comparative Preparation Example 3 | 0.00 | 0.00 | — | — | 2.07 | 10.0 | — | 2.07 | — |
| Comparative Preparation Example 4 | 0.00 | 0.00 | — | — | 2.76 | 38.9 | — | 2.76 | — |
| Comparative Preparation Example 5 | 0.00 | 0.00 | — | — | 5.90 | 50.0 | — | 5.90 | — |
| Comparative Preparation Example 6 | 0.88 | 0.32 | 8.3 | 1.0 | 0.00 | — | — | 1.20 | 0.00 |
| Comparative Preparation Example 7 | 0.88 | 0.32 | 8.3 | 1.0 | 0.89 | — | — | 2.08 | 0.74 |
| Comparative Preparation Example 8 | 0.88 | 0.32 | 8.3 | 1.0 | 5.90 | 50.0 | 0.81 | 7.10 | 4.94 |
| Comparative Preparation Example 9 | 0.88 | 0.97 | 18.9 | 1.0 | 0.00 | — | — | 1.84 | 0.00 |
| Comparative Preparation Example 10 | 0.88 | 0.97 | 18.9 | 1.0 | 1.18 | — | — | 3.02 | 0.64 |
| Comparative Preparation Example 11 | 0.88 | 0.97 | 18.9 | 1.0 | 5.90 | 50.0 | 0.71 | 7.75 | 3.20 |
| Comparative Preparation Example 12 | 0.88 | 1.06 | 20.5 | 1.0 | 0.00 | — | — | 1.93 | 0.00 |

TABLE 9-continued

| | First Transmission Cut-Off Region | | | | Second Transmission Cut-Off Region | | | | |
|---|---|---|---|---|---|---|---|---|---|
| | N1 parts by weight | N2 parts by weight | W1 [nm] | OD1 | U1 parts by weight | W2 [nm] | OD2 | N1 + N2 + U1 parts by weight | U1/ (N1 + N2) |
| Comparative Preparation Example 13 | 0.88 | 1.06 | 20.5 | 1.0 | 1.18 | — | — | 3.11 | 0.61 |
| Comparative Preparation Example 14 | 0.88 | 1.06 | 20.5 | 1.0 | 5.90 | 50.0 | 0.70 | 7.84 | 3.05 |
| Comparative Preparation Example 15 | 0.88 | 1.93 | 35.4 | 1.0 | 0.00 | — | — | 2.81 | 0.00 |
| Comparative Preparation Example 16 | 0.88 | 1.93 | 35.4 | 1.0 | 1.57 | — | — | 4.38 | 0.56 |
| Comparative Preparation Example 17 | 0.88 | 1.93 | 35.4 | 1.0 | 1.97 | 27.8 | 0.23 | 4.78 | 0.70 |
| Comparative Preparation Example 18 | 0.88 | 1.93 | 35.4 | 1.0 | 2.46 | 43.0 | 0.27 | 5.27 | 0.88 |
| Comparative Preparation Example 19 | 0.88 | 1.93 | 35.4 | 1.0 | 5.90 | 50.0 | 0.61 | 8.71 | 2.10 |

Figure 4:
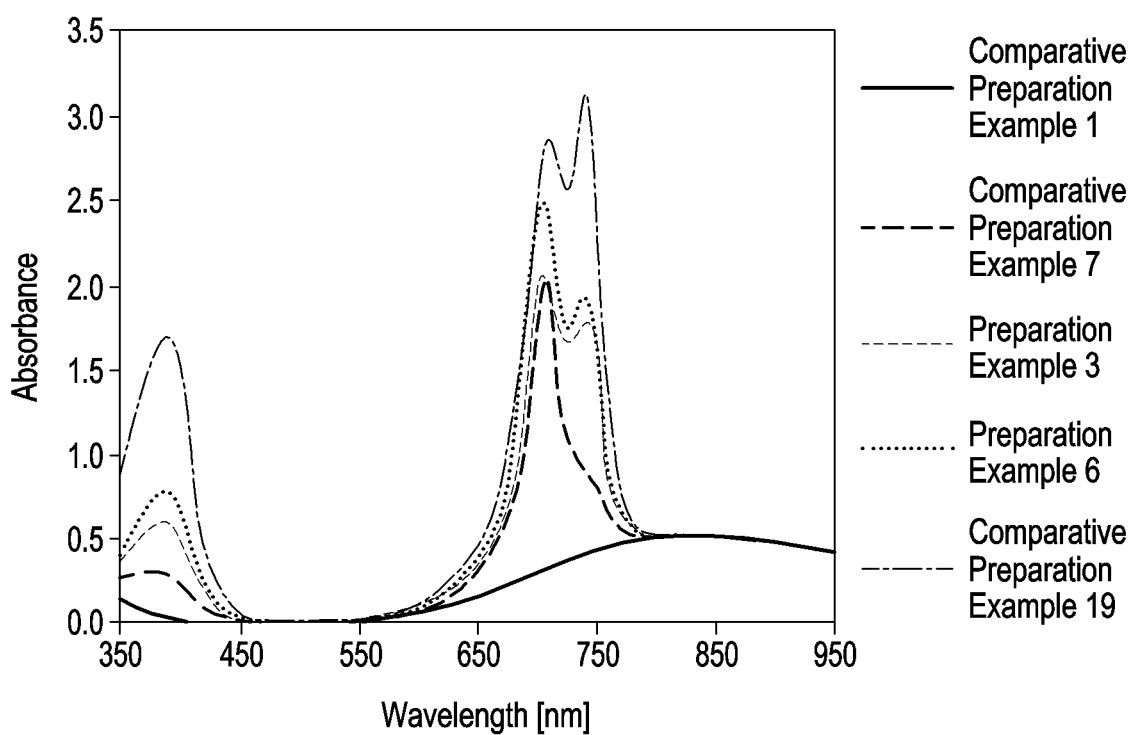
FIG. 4 is a graph showing absorption curves for preparation examples and comparative preparation examples.

The wavelength width (W1) of the first transmission cut-off region, the wavelength width (W2) of the second transmission cut-off region and the absorbance value for the optical components according to the Comparative Preparation Examples 1 to 19 which were measured by substantially the same method as the transmission rate and the absorbance measurement method for the optical components according to the Preparation Examples 1 to 6 as stated above were calculated. The results are stated in Table 9 above. Furthermore, the absorbance curve for each optical component according to Comparative Preparation Example 1, Comparative Preparation Example 7 and Comparative Preparation Example 19 as disclosed in Table 9 above is also illustrated in FIG. 4. Referring to Table 9 and FIG. 4, when the amount of N1, N2 and U1 was changed to be in the range of 0 to 4.94 weight ratio for the amount ratio (U1/(N1+N2)) of the ultraviolet absorption dye with respect to the near-infrared absorption dye with a near infrared absorbing dye while the combined amount (N1+N2+U1) of the near infrared absorbing dye, N1 and N2 and the ultraviolet absorbing dye, U1 being in 0 to 8.71 parts by weight range, it is known to be possible to control the wavelength width (W1) of the first transmission cut-off region being in 8.3 nm to 35.4 nm range by controlling the amount of N1 and N2 and to control the wavelength width (W2) of the second transmission cut-off region being in 10.0 nm to 50.0 nm range by controlling the amount of U1. However in a limited range where the sum amount (N1+N2+U1) is 4.78 to 8.71 parts by weight and the amount ratio (U1/(N1+N2)) is 0.70 to 4.94 weight ratio, the first and second transmission cut-off regions are formed at the same time when the OD2 value is 0.23 to 0.81 and it can be known for the wavelength width (W1) of the first transmission cut-off region at that time to be formed in 8.3 nm to 35.4 nm and the wavelength width (W2) of the second transmission cut-off region at that time to be formed in 27.8 nm to 50.0 nm range. In addition, it can be seen that the first transmission cut-off region and the second transmission cut-off region do not exist when the near-infrared absorption dye is not included or the ultraviolet absorption dye is not included.

Comparative Preparation Examples 20 to 38

Except for the amount of the near-infrared absorption dye N1 having the maximum absorption region at 710±5 nm, the near-infrared absorption dye N2 having the maximum absorption region at 740±5 nm, and the ultraviolet absorption dye U1 having the maximum absorption region at 380±5 nm, the optical components for Comparative Preparation Examples 20 to 38 were prepared with substantially the same method as the Preparation Examples 7 to 12 as stated above. The amount of the near-infrared absorption dye and the ultraviolet absorption dye is stated as following Table 10 for this case.

TABLE 10

| | First Transmission Cut-Off Region | | | | Second Transmission Cut-Off Region | | | | |
|---|---|---|---|---|---|---|---|---|---|
| | N1 parts by weight | N2 parts by weight | W1 [nm] | OD1 | U1 parts by weight | W2 [nm] | OD2 | N1 + N2 + U1 parts by weight | U1/(N1 + N2) |
| Comparative Preparation Example 20 | 0.00 | 0.00 | — | — | 0.00 | — | — | 0.00 | — |
| Comparative Preparation Example 21 | 0.00 | 0.00 | — | — | 1.18 | — | — | 1.18 | — |
| Comparative Preparation Example 22 | 0.00 | 0.00 | — | — | 2.07 | 10.5 | — | 2.07 | — |
| Comparative Preparation Example 23 | 0.00 | 0.00 | — | — | 2.76 | 39.1 | — | 2.76 | — |
| Comparative Preparation Example 24 | 0.00 | 0.00 | — | — | 5.90 | 50.0 | — | 5.90 | — |
| Comparative Preparation Example 25 | 0.88 | 0.24 | 8.6 | 1.0 | 0.00 | — | — | 1.12 | 0.00 |
| Comparative Preparation Example 26 | 0.88 | 0.24 | 8.6 | 1.0 | 1.18 | — | — | 2.30 | 1.06 |
| Comparative Preparation Example 27 | 0.88 | 0.24 | 8.6 | 1.0 | 5.90 | 50.0 | 0.80 | 7.02 | 5.29 |
| Comparative Preparation Example 28 | 0.88 | 0.87 | 18.6 | 1.0 | 0.00 | — | — | 1.75 | 0.00 |
| Comparative Preparation Example 29 | 0.88 | 0.87 | 18.6 | 1.0 | 1.18 | — | — | 2.93 | 0.68 |
| Comparative Preparation Example 30 | 0.88 | 0.87 | 18.6 | 1.0 | 5.90 | 50.0 | 0.71 | 7.65 | 3.38 |
| Comparative Preparation Example 31 | 0.88 | 1.02 | 21.3 | 1.0 | 0.00 | — | — | 1.89 | 0.00 |
| Comparative Preparation Example 32 | 0.88 | 1.02 | 21.3 | 1.0 | 1.18 | — | — | 3.07 | 0.62 |
| Comparative Preparation Example 33 | 0.88 | 1.02 | 21.3 | 1.0 | 5.90 | 50.0 | 0.70 | 7.80 | 3.12 |
| Comparative Preparation Example 34 | 0.88 | 1.93 | 36.0 | 1.0 | 0.00 | — | — | 2.81 | 0.00 |
| Comparative Preparation Example 35 | 0.88 | 1.93 | 36.0 | 1.0 | 1.18 | — | — | 3.99 | 0.42 |
| Comparative Preparation Example 36 | 0.88 | 1.93 | 36.0 | 1.0 | 2.11 | 33.1 | 0.24 | 4.92 | 0.75 |
| Comparative Preparation Example 37 | 0.88 | 1.93 | 36.0 | 1.0 | 2.36 | 40.2 | 0.26 | 5.17 | 0.84 |
| Comparative Preparation Example 38 | 0.88 | 1.93 | 36.0 | 1.0 | 5.90 | 50.0 | 0.60 | 8.71 | 2.10 |

The wavelength width (W1) of the first transmission cut-off region, the wavelength width (W2) of the second transmission cut-off region and the absorbance value for the optical components according to the Comparative Preparation Examples 20 to 38 which were measured by substantially the same method as the transmission rate and the absorbance measurement method for the optical components according to the Preparation Examples 1 to 6 as stated above were calculated. The results are stated in Table 10 above. Referring to Table 10, when the amount of N1, N2 and U1 was changed to be in the range of 0 to 5.29 weight ratio for the amount ratio (U1/(N1+N2)) of the ultraviolet absorption dye with respect to the near-infrared absorption dye with a near infrared absorbing dye while the combined amount (N1+N2+U1) of the near infrared absorbing dye, N1 and N2 and the ultraviolet absorbing dye, U1 being in 0 to 8.71 parts by weight range, it is known to be possible to control the wavelength width (W1) of the first transmission cut-off region being in 8.6 nm to 36.0 nm range by controlling the amount of N1 and N2 and to control the wavelength width (W2) of the second transmission cut-off region being in 10.5 nm to 50.0 nm range by controlling the amount of U1.

However in a limited range where the sum amount (N1+N2+U1) is 4.92 to 8.71 parts by weight and the amount ratio (U1/(N1+N2)) is 0.75 to 5.29 weight ratio, the first and second transmission cut-off regions are formed at the same time when the OD2 value is 0.24 to 0.80 and it can be known for the wavelength width (W1) of the first transmission cut-off region at that time to be formed in 8.6 nm to 36.0 nm and the wavelength width (W2) of the second transmission cut-off region at that time to be formed in 33.1 nm to 50.0 nm range. In addition, it can be seen that the first transmission cut-off region and the second transmission cut-off region do not exist when the near-infrared absorption dye is not included or the ultraviolet absorption dye is not included.

Comparative Preparation Examples 39 to 57

Except for the amount of the near-infrared absorption dye N1 having the maximum absorption region at 710±5 nm, the near-infrared absorption dye N2 having the maximum absorption region at 740±5 nm, and the ultraviolet absorption dye U1 having the maximum absorption region at 380±5 nm, the optical components for Comparative Preparation Examples 39 to 57 were prepared with substantially the same method as the Preparation Examples 13 to 18 as stated above. The amount of the near-infrared absorption dye and the ultraviolet absorption dye is stated as following Table 11 for this case.

TABLE 11

| | First Transmission Cut-Off Region | | | | Second Transmission Cut-Off Region | | | | |
|---|---|---|---|---|---|---|---|---|---|
| | N1 parts by weight | N2 parts by weight | W1 [nm] | OD1 | U1 parts by weight | W2 [nm] | OD2 | N1 + N2 + U1 parts by weight | U1/ (N1 + N2) |
| Comparative Preparation Example 39 | 0.00 | 0.00 | — | — | 0.00 | — | — | 0.00 | — |
| Comparative Preparation Example 40 | 0.00 | 0.00 | — | — | 1.18 | — | — | 1.18 | — |
| Comparative Preparation Example 41 | 0.00 | 0.00 | — | — | 2.07 | 11.3 | — | 2.07 | — |
| Comparative Preparation Example 42 | 0.00 | 0.00 | — | — | 2.66 | 37.3 | — | 2.66 | — |
| Comparative Preparation Example 43 | 0.00 | 0.00 | — | — | 5.90 | 50.0 | — | 5.90 | — |
| Comparative Preparation Example 44 | 0.88 | 0.19 | 10.0 | 1.0 | 0.00 | — | — | 1.07 | 0.00 |
| Comparative Preparation Example 45 | 0.88 | 0.19 | 10.0 | 1.0 | 1.18 | — | — | 2.25 | 1.11 |
| Comparative Preparation Example 46 | 0.88 | 0.19 | 10.0 | 1.0 | 5.90 | 50.0 | 0.79 | 6.97 | 5.53 |
| Comparative Preparation Example 47 | 0.88 | 0.77 | 18.8 | 1.0 | 0.00 | — | — | 1.65 | 0.00 |
| Comparative Preparation Example 48 | 0.88 | 0.77 | 18.8 | 1.0 | 1.18 | — | — | 2.83 | 0.72 |
| Comparative Preparation Example 49 | 0.88 | 0.77 | 18.8 | 1.0 | 5.90 | 50.0 | 0.71 | 7.55 | 3.58 |
| Comparative Preparation Example 50 | 0.88 | 0.97 | 22.3 | 1.0 | 0.00 | — | — | 1.84 | 0.00 |
| Comparative Preparation Example 51 | 0.88 | 0.97 | 22.3 | 1.0 | 1.18 | — | — | 3.02 | 0.64 |
| Comparative Preparation Example 52 | 0.88 | 0.97 | 22.3 | 1.0 | 5.90 | 50.0 | 0.69 | 7.75 | 3.20 |
| Comparative Preparation Example 53 | 0.88 | 1.93 | 36.6 | 1.0 | 0.00 | — | — | 2.81 | 0.00 |
| Comparative Preparation Example 54 | 0.88 | 1.93 | 36.6 | 1.0 | 1.57 | — | — | 4.38 | 0.56 |
| Comparative Preparation Example 55 | 0.88 | 1.93 | 36.6 | 1.0 | 2.30 | 39.0 | 0.25 | 5.11 | 0.82 |

TABLE 11-continued

| | First Transmission Cut-Off Region | | | | Second Transmission Cut-Off Region | | | | |
|---|---|---|---|---|---|---|---|---|---|
| | N1 parts by weight | N2 parts by weight | W1 [nm] | OD1 | U1 parts by weight | W2 [nm] | OD2 | N1 + N2 + U1 parts by weight | U1/ (N1 + N2) |
| Comparative Preparation Example 56 | 0.88 | 1.93 | 36.6 | 1.0 | 2.36 | 40.8 | 0.26 | 5.17 | 0.84 |
| Comparative Preparation Example 57 | 0.88 | 1.93 | 36.6 | 1.0 | 5.90 | 50.0 | 0.59 | 8.71 | 2.10 |

The wavelength width (W1) of the first transmission cut-off region, the wavelength width (W2) of the second transmission cut-off region and the absorbance value for the optical components according to the Comparative Preparation Examples 39 to 57 which were measured by substantially the same method as the transmission rate and the absorbance measurement method for the optical components according to the Preparation Examples 1 to 6 as stated above were calculated. The results are stated in Table 11 above. Referring to Table 11, when the amount of N1, N2 and U1 was changed to be in the range of 0 to 5.53 weight ratio for the amount ratio (U1/(N1+N2)) of the ultraviolet absorption dye with respect to the near-infrared absorption dye with a near infrared absorbing dye while the combined amount (N1+N2+U1) of the near infrared absorbing dye, N1 and N2 and the ultraviolet absorbing dye, U1 being in 0 to 8.71 parts by weight range, it is known to be possible to control the wavelength width (W1) of the first transmission cut-off region being in 10.0 nm to 36.6 nm range by controlling the amount of N1 and N2 and to control the wavelength width (W2) of the second transmission cut-off region being in 11.3 nm to 50.0 nm range by controlling the amount of U1. However in a limited range where the sum amount (N1+N2+U1) is 5.11 to 8.71 parts by weight and the amount ratio (U1/(N1+N2)) is 0.82 to 5.53 weight ratio, the first and second transmission cut-off regions are formed at the same time when the OD2 value is 0.25 to 0.79 and it can be known for the wavelength width (W1) of the first transmission cut-off region at that time to be formed in 10 nm to 36.6 nm and the wavelength width (W2) of the second transmission cut-off region at that time to be formed in 39.0 nm to 50.0 nm range. In addition, it can be seen that the first transmission cut-off region and the second transmission cut-off region do not exist when the near-infrared absorption dye is not included or the ultraviolet absorption dye is not included.

Comparative Preparation Examples 58 to 76

Except for the amount of the near-infrared absorption dye N1 having the maximum absorption region at 710±5 nm, the near-infrared absorption dye N2 having the maximum absorption region at 740±5 nm, and the ultraviolet absorption dye U1 having the maximum absorption region at 380±5 nm, the optical components for Comparative Preparation Examples 58 to 76 were prepared with substantially the same method as the Preparation Examples 19 to 24 as stated above. The amount of the near-infrared absorption dye and the ultraviolet absorption dye is stated as following Table 12 for this case.

TABLE 12

| | First Transmission Cut-Off Region | | | | Second Transmission Cut-Off Region | | | | |
|---|---|---|---|---|---|---|---|---|---|
| | N1 parts by weight | N2 parts by weight | W1 [nm] | OD1 | U1 parts by weight | W2 [nm] | OD2 | N1 + N2 + U1 parts by weight | U1/ (N1 + N2) |
| Comparative Preparation Example 58 | 0.00 | 0.00 | — | — | 0.00 | — | — | 0.00 | — |
| Comparative Preparation Example 59 | 0.00 | 0.00 | — | — | 0.98 | — | — | 0.98 | — |
| Comparative Preparation Example 60 | 0.00 | 0.00 | — | — | 2.05 | 9.4 | — | 2.05 | — |
| Comparative Preparation Example 61 | 0.00 | 0.00 | — | — | 2.66 | 37.5 | — | 2.66 | — |
| Comparative Preparation Example 62 | 0.00 | 0.00 | — | — | 5.90 | 50.0 | — | 5.90 | — |
| Comparative Preparation Example 63 | 0.88 | 0.10 | 9.9 | 1.0 | 0.00 | — | — | 0.98 | 0.00 |
| Comparative Preparation Example 64 | 0.88 | 0.10 | 9.9 | 1.0 | 1.38 | — | — | 2.35 | 1.42 |

TABLE 12-continued

|  | First Transmission Cut-Off Region | | | | Second Transmission Cut-Off Region | | | | |
| --- | --- | --- | --- | --- | --- | --- | --- | --- | --- |
|  | N1 parts by weight | N2 parts by weight | W1 [nm] | OD1 | U1 parts by weight | W2 [nm] | OD2 | N1 + N2 + U1 parts by weight | U1/ (N1 + N2) |
| Comparative Preparation Example 65 | 0.88 | 0.10 | 9.9 | 1.0 | 5.90 | 50.0 | 0.79 | 6.88 | 6.08 |
| Comparative Preparation Example 66 | 0.88 | 0.58 | 17.2 | 1.0 | 0.00 | — | — | 1.46 | 0.00 |
| Comparative Preparation Example 67 | 0.88 | 0.58 | 17.2 | 1.0 | 1.38 | — | — | 2.83 | 0.95 |
| Comparative Preparation Example 68 | 0.88 | 0.58 | 17.2 | 1.0 | 5.90 | 50.0 | 0.72 | 7.36 | 4.06 |
| Comparative Preparation Example 69 | 0.88 | 0.77 | 20.1 | 1.0 | 0.00 | — | — | 1.65 | 0.00 |
| Comparative Preparation Example 70 | 0.88 | 0.77 | 20.1 | 1.0 | 1.38 | — | — | 3.03 | 0.84 |
| Comparative Preparation Example 71 | 0.88 | 0.77 | 20.1 | 1.0 | 5.90 | 50.0 | 0.70 | 7.55 | 3.58 |
| Comparative Preparation Example 72 | 0.88 | 1.93 | 37.1 | 1.0 | 0.00 | — | — | 2.81 | 0.00 |
| Comparative Preparation Example 73 | 0.88 | 1.93 | 37.1 | 1.0 | 1.38 | — | — | 4.19 | 0.49 |
| Comparative Preparation Example 74 | 0.88 | 1.93 | 37.1 | 1.0 | 2.17 | 35.6 | 0.24 | 4.97 | 0.77 |
| Comparative Preparation Example 75 | 0.88 | 1.93 | 37.1 | 1.0 | 2.36 | 41.2 | 0.25 | 5.17 | 0.84 |
| Comparative Preparation Example 76 | 0.88 | 1.93 | 37.1 | 1.0 | 5.90 | 50.0 | 0.58 | 8.71 | 2.10 |

The wavelength width (W1) of the first transmission cut-off region, the wavelength width (W2) of the second transmission cut-off region and the absorbance value for the optical components according to the Comparative Preparation Examples 58 to 76 which were measured by substantially the same method as the transmission rate and the absorbance measurement method for the optical components according to the Preparation Examples 1 to 6 as stated above were calculated. The results are stated in Table 12 above. Referring to Table 12, when the amount of N1, N2 and U1 was changed to be in the range of 0 to 6.08 weight ratio for the amount ratio (U1/(N1+N2)) of the ultraviolet absorption dye with respect to the near-infrared absorption dye with a near infrared absorbing dye while the combined amount (N1+N2+U1) of the near infrared absorbing dye, N1 and N2 and the ultraviolet absorbing dye, U1 being in 0 to 8.71 parts by weight range, it is known to be possible to control the wavelength width (W1) of the first transmission cut-off region being in 9.9 nm to 37.1 nm range by controlling the amount of N1 and N2 and to control the wavelength width (W2) of the second transmission cut-off region being in 9.4 nm to 50.0 nm range by controlling the amount of U1. However in a limited range where the sum amount (N1+N2+U1) is 4.97 to 8.71 parts by weight and the amount ratio (U1/(N1+N2)) is 0.77 to 6.08 weight ratio, the first and second transmission cut-off regions are formed at the same time when the OD2 value is 0.24 to 0.79 and it can be known for the wavelength width (W1) of the first transmission cut-off region at that time to be formed in 9.9 nm to 37.1 nm and the wavelength width (W2) of the second transmission cut-off region at that time to be formed in 35.6 nm to 50.0 nm range. In addition, it can be seen that the first transmission cut-off region and the second transmission cut-off region do not exist when the near-infrared absorption dye is not included or the ultraviolet absorption dye is not included.

Comparative Examples 1 to 76

Except for using the optical components prepared in Comparative Preparation Examples 1 to 76, the optical filters according to Comparative Examples 1 to 76 were prepared with substantially the same method as the Embodiments 1 to 24.

Experimental Example 1

As described above, the optical component according to the present invention can provide the first transmission cut-off region and the second transmission cut-off region by providing a dye dispersion layer. It could be seen through a various preparation examples and comparative examples that the wavelength width and its status of existence of the first and the second transmission cut-off regions could be decided according to the amount, the amount ratio and OD2 value of each of the near-infrared absorption dye and the ultraviolet absorption dye. In addition, to suppress the integral value change at the visible light transmission rate curve under 1% by suppressing the short wavelength shift at the visible light transmission rate curve with respect to the incident angle increment of the light source despite of the incident angle increment, it is necessary to superimpose the transition region for the selective wavelength reflecting layer placed on at least one side of the optical component and the transmission cut-off region of the optical component each other and it can be seen that it is possible to control its wavelength width to superimpose the transmission cut-off region.

In the present Experiment Example 1, the experiment as stated below was carried out to investigate the spectral characteristics of the optical component according to the present invention how to provide the optical characteristics as to the spectral characteristics of the optical filter including the optical component.

First, the transmission spectrum was measured to each of the optical component used for the optical filters prepared by Embodiments 1 to 2 4 and Comparative Examples 1 to 76 in 300 nm to 1,200 nm wavelength range and the incident angle of 0° condition using the spectrophotometer. From the obtained transmission rate curve, the longest wavelength ($\lambda$_cut-on) having a transmission rate of 50% in 430 nm or less wavelength range and the shortest wavelength ($\lambda$_cut-off) having a transmission rate of 50% in 565 nm or more wavelength range were calculated. Further, the visible light average transmission rate in 430 nm to 565 nm wavelength range, the near-infrared average transmission rate in 800 nm to 1,200 nm wavelength range and the average transmission rate at 1,200 nm were measured and disclosed in Table 13. In addition, the transmission spectrum measurement to each specimen taken from the optical components prepared by Preparation Example 3, Preparation Example 6, Comparative Preparation Example 7 and Comparative Preparation Example 19 is disclosed in FIGS. 7 to 10, respectively.

Referring Table 13 and FIGS. 7 to 10, it can be seen that $\lambda$_cut-on exists in 410 nm to 420 nm wavelength range and $\lambda$_cut-off exists in 625 nm to 645 nm wavelength range for the optical components of Preparation Examples 1 to 24 comprising the first and second transmission cut-off region. In addition, since the visible light average transmission rate is 87% or higher, it is possible to provide a bright image sufficiently reproducing the original color of the subject when it is parallelly used with a commercial image sensor. On the contrary, if the optical components of Comparative Preparation Examples 1 to 76 do not have either one of the first or the second transmission cut-off region or both of them, or do have both of them but have a case where the wavelength width is excessively wide, it is difficult to obtain a good image quality when it is parallelly used with a commercial image sensor since $\lambda$_cut-on is excessively off from 410 nm to 420 nm range, $\lambda$_cut-off is excessively off from 625 nm to 645 nm range, or the visible light average transmission rate is lowered to 87% or below.

Furthermore, referring to Table 13 and FIGS. 7 to 10, it can be understood that the average transmission rate of the optical component from Preparation Examples 1 to 24 and Comparative Preparation Examples 1 to 76 in 800 nm to 1,200 nm is 25% or more and 1,200 nm transmittance is 50% or more. These results indicate that the transmission rate at 800 nm or more is not significantly affected by the presence or absence of the first and second transmission cut-off region, and it can be seen that it is mainly influenced by the near-infrared absorption glass substrate.

Furthermore, in the optical component having the first and second transmission cut-off region according to the present invention, the transmission spectrum was measured to each of the optical components according to Preparation Examples 1 to 24 in 300 nm to 1,200 nm range with the incident angle of 0° to 40° conditions more specifically to investigate the short wavelength shift with respect to the incident angle increment of the light source in the second transmission cut-off region. From the obtained transmission rate curve, the absolute value of the difference (|$\lambda$_T30%@0°-$\lambda$_T30%@40°|) between the wavelength) ($\lambda$_T30%@0°) where the measured transmission rate is 30% at 0° incident angle condition in 400 nm to 410 nm wavelength range and the wavelength ($\lambda$_T30%@40°) where the measured transmission rate is 30% at 40° incident angle condition in 400 nm to 410 nm wavelength range was calculated. The results are shown in Table 14. Referring to Table 14, it can be seen that the value, |$\lambda$_T30%@0°-$\lambda$_T30%@40°|, shows the value of 1.2 nm to 1.8 nm and it can be confirmed that the value of the wavelength shift representing 30% transmission rate as a reference to a short wavelength shift is strictly controlled under 2 nm or below even if the incident angle is increased to 40°.

TABLE 13

| | $\lambda$_cut-on [nm] | $\lambda$_cut-off [nm] | Visible Light Transmission Rate [%] | 800~1200 nm Average Transmission Rate [%] | 1200 nm Transmission Rate [%] |
|---|---|---|---|---|---|
| Preparation Example 1 | 413.6 | 644.2 | 88.1 | 41.5 | 62.3 |
| Preparation Example 2 | 417.4 | 644.2 | 88.0 | 41.5 | 62.3 |
| Preparation Example 3 | 414.1 | 636.1 | 87.4 | 41.4 | 62.2 |
| Preparation Example 4 | 417.5 | 636.1 | 87.3 | 41.4 | 62.2 |
| Preparation Example 5 | 414.5 | 635.3 | 87.3 | 41.4 | 62.2 |
| Preparation Example 6 | 418.0 | 635.3 | 87.2 | 41.4 | 62.2 |
| Preparation Example 7 | 413.6 | 641.8 | 88.0 | 37.4 | 59.0 |
| Preparation Example 8 | 417.4 | 641.8 | 87.9 | 37.4 | 59.0 |
| Preparation Example 9 | 414.7 | 634.7 | 87.3 | 37.4 | 59.0 |
| Preparation Example 10 | 417.4 | 634.7 | 87.2 | 37.4 | 59.0 |
| Preparation Example 11 | 415.1 | 633.4 | 87.2 | 37.4 | 58.9 |
| Preparation Example 12 | 417.6 | 633.4 | 87.1 | 37.4 | 58.9 |
| Preparation Example 13 | 413.6 | 638.4 | 87.9 | 32.9 | 55.1 |
| Preparation Example 14 | 416.7 | 638.4 | 87.7 | 32.9 | 55.1 |
| Preparation Example 15 | 414.9 | 632.7 | 87.2 | 32.9 | 55.1 |
| Preparation Example 16 | 416.9 | 632.7 | 87.1 | 32.9 | 55.1 |
| Preparation Example 17 | 415.5 | 631.1 | 87.0 | 32.9 | 55.1 |
| Preparation Example 18 | 417.1 | 631.1 | 87.0 | 32.9 | 55.1 |
| Preparation Example 19 | 413.8 | 636.7 | 87.8 | 29.8 | 52.3 |
| Preparation Example 20 | 417.1 | 636.7 | 87.6 | 29.8 | 52.3 |
| Preparation Example 21 | 415.1 | 632.2 | 87.2 | 29.8 | 52.2 |

TABLE 13-continued

| | λ_cut-on [nm] | λ_cut-off [nm] | Visible Light Transmission Rate [%] | 800~1200 nm Average Transmission Rate [%] | 1200 nm Transmission Rate [%] |
|---|---|---|---|---|---|
| Preparation Example 22 | 416.7 | 632.2 | 87.2 | 29.8 | 52.2 |
| Preparation Example 23 | 415.3 | 630.6 | 87.0 | 29.8 | 52.2 |
| Preparation Example 24 | 416.4 | 630.6 | 87.0 | 29.8 | 52.2 |
| Comparative Preparation Example 1 | 329.1 | 690.2 | 90.3 | 42.0 | 62.4 |
| Comparative Preparation Example 2 | 337.1 | 690.2 | 90.1 | 42.0 | 62.5 |
| Comparative Preparation Example 3 | 412.2 | 690.2 | 89.8 | 42.0 | 62.5 |
| Comparative Preparation Example 4 | 415.9 | 690.2 | 89.6 | 42.0 | 62.5 |
| Comparative Preparation Example 5 | 424.0 | 690.2 | 88.9 | 42.0 | 62.5 |
| Comparative Preparation Example 6 | 335.6 | 644.2 | 88.6 | 41.5 | 62.2 |
| Comparative Preparation Example 7 | 399.4 | 644.2 | 88.4 | 41.5 | 62.3 |
| Comparative Preparation Example 8 | 425.4 | 644.2 | 87.3 | 41.5 | 62.3 |
| Comparative Preparation Example 9 | 339.8 | 636.1 | 87.8 | 41.4 | 62.2 |
| Comparative Preparation Example 10 | 407.3 | 636.1 | 87.6 | 41.4 | 62.2 |
| Comparative Preparation Example 11 | 426.0 | 636.1 | 86.6 | 41.4 | 62.2 |
| Comparative Preparation Example 12 | 340.4 | 635.3 | 87.7 | 41.4 | 62.2 |
| Comparative Preparation Example 13 | 407.4 | 635.3 | 87.5 | 41.4 | 62.2 |
| Comparative Preparation Example 14 | 426.0 | 635.3 | 86.5 | 41.4 | 62.2 |
| Comparative Preparation Example 15 | 345.4 | 628.5 | 86.8 | 41.3 | 62.1 |
| Comparative Preparation Example 16 | 413.2 | 628.5 | 86.4 | 41.3 | 62.1 |
| Comparative Preparation Example 17 | 416.1 | 628.5 | 86.3 | 41.3 | 62.1 |
| Comparative Preparation Example 18 | 418.7 | 628.5 | 86.2 | 41.3 | 62.1 |
| Comparative Preparation Example 19 | 426.9 | 628.5 | 85.6 | 41.3 | 62.1 |
| Comparative Preparation Example 20 | 330.8 | 679.5 | 90.1 | 37.9 | 59.2 |
| Comparative Preparation Example 21 | 403.0 | 679.5 | 89.8 | 37.9 | 59.2 |
| Comparative Preparation Example 22 | 412.3 | 679.5 | 89.6 | 37.9 | 59.2 |
| Comparative Preparation Example 23 | 416.0 | 679.5 | 89.5 | 37.9 | 59.2 |
| Comparative Preparation Example 24 | 424.1 | 679.5 | 88.8 | 37.9 | 59.2 |
| Comparative Preparation Example 25 | 337.2 | 641.8 | 88.5 | 37.4 | 59.0 |
| Comparative Preparation Example 26 | 406.0 | 641.8 | 88.2 | 37.4 | 59.0 |
| Comparative Preparation Example 27 | 425.4 | 641.8 | 87.2 | 37.4 | 59.0 |
| Comparative Preparation Example 28 | 340.9 | 634.7 | 87.8 | 37.4 | 58.9 |
| Comparative Preparation Example 29 | 407.2 | 634.7 | 87.5 | 37.4 | 58.9 |
| Comparative Preparation Example 30 | 425.9 | 634.7 | 86.5 | 37.4 | 59.0 |
| Comparative Preparation Example 31 | 341.6 | 633.4 | 87.6 | 37.4 | 58.9 |
| Comparative Preparation Example 32 | 407.4 | 633.4 | 87.3 | 37.4 | 58.9 |
| Comparative Preparation Example 33 | 426.0 | 633.4 | 86.4 | 37.4 | 59.0 |
| Comparative Preparation Example 34 | 346.5 | 626.8 | 86.6 | 37.3 | 58.8 |
| Comparative Preparation Example 35 | 409.1 | 626.8 | 86.3 | 37.3 | 58.9 |
| Comparative Preparation Example 36 | 417.0 | 626.8 | 86.1 | 37.3 | 58.9 |
| Comparative Preparation Example 37 | 418.3 | 626.8 | 86.1 | 37.3 | 58.9 |
| Comparative Preparation Example 38 | 426.9 | 626.8 | 85.4 | 37.3 | 58.9 |
| Comparative Preparation Example 39 | 332.7 | 669.0 | 89.9 | 33.4 | 55.3 |
| Comparative Preparation Example 40 | 403.1 | 669.0 | 89.6 | 33.4 | 55.3 |
| Comparative Preparation Example 41 | 412.3 | 669.0 | 89.4 | 33.4 | 55.3 |
| Comparative Preparation Example 42 | 415.6 | 669.0 | 89.3 | 33.4 | 55.3 |
| Comparative Preparation Example 43 | 424.1 | 669.0 | 88.5 | 33.4 | 55.3 |
| Comparative Preparation Example 44 | 339.1 | 638.4 | 88.3 | 32.9 | 55.1 |
| Comparative Preparation Example 45 | 406.1 | 638.4 | 88.0 | 32.9 | 55.1 |
| Comparative Preparation Example 46 | 425.4 | 638.4 | 87.0 | 32.9 | 55.2 |

TABLE 13-continued

| | λ_cut-on [nm] | λ_cut-off [nm] | Visible Light Transmission Rate [%] | 800~1200 nm Average Transmission Rate [%] | 1200 nm Transmission Rate [%] |
|---|---|---|---|---|---|
| Comparative Preparation Example 47 | 342.0 | 632.7 | 87.7 | 32.9 | 55.1 |
| Comparative Preparation Example 48 | 407.1 | 632.7 | 87.4 | 32.9 | 55.1 |
| Comparative Preparation Example 49 | 425.9 | 632.7 | 86.4 | 32.9 | 55.1 |
| Comparative Preparation Example 50 | 342.9 | 631.1 | 87.4 | 32.9 | 55.1 |
| Comparative Preparation Example 51 | 407.4 | 631.1 | 87.2 | 32.9 | 55.1 |
| Comparative Preparation Example 52 | 426.0 | 631.1 | 86.2 | 32.9 | 55.1 |
| Comparative Preparation Example 53 | 347.7 | 624.8 | 86.4 | 32.8 | 55.0 |
| Comparative Preparation Example 54 | 413.4 | 624.8 | 86.0 | 32.8 | 55.0 |
| Comparative Preparation Example 55 | 418.1 | 624.8 | 85.9 | 32.8 | 55.0 |
| Comparative Preparation Example 56 | 418.3 | 624.8 | 85.9 | 32.8 | 55.0 |
| Comparative Preparation Example 57 | 426.9 | 624.8 | 85.2 | 32.8 | 55.0 |
| Comparative Preparation Example 58 | 334.1 | 662.1 | 89.7 | 30.2 | 52.4 |
| Comparative Preparation Example 59 | 397.6 | 662.1 | 89.5 | 30.2 | 52.4 |
| Comparative Preparation Example 60 | 412.3 | 662.1 | 89.2 | 30.2 | 52.4 |
| Comparative Preparation Example 61 | 415.6 | 662.1 | 89.1 | 30.2 | 52.4 |
| Comparative Preparation Example 62 | 424.1 | 662.1 | 88.4 | 30.2 | 52.4 |
| Comparative Preparation Example 63 | 340.0 | 636.7 | 88.2 | 29.8 | 52.2 |
| Comparative Preparation Example 64 | 408.5 | 636.7 | 87.9 | 29.8 | 52.3 |
| Comparative Preparation Example 65 | 425.3 | 636.7 | 86.9 | 29.8 | 52.3 |
| Comparative Preparation Example 66 | 342.2 | 632.2 | 87.7 | 29.8 | 52.2 |
| Comparative Preparation Example 67 | 409.3 | 632.2 | 87.4 | 29.8 | 52.2 |
| Comparative Preparation Example 68 | 425.7 | 632.2 | 86.4 | 29.8 | 52.2 |
| Comparative Preparation Example 69 | 343.1 | 630.6 | 87.5 | 29.8 | 52.2 |
| Comparative Preparation Example 70 | 409.7 | 630.6 | 87.2 | 29.8 | 52.2 |
| Comparative Preparation Example 71 | 425.9 | 630.6 | 86.2 | 29.8 | 52.2 |
| Comparative Preparation Example 72 | 348.7 | 623.2 | 86.2 | 29.7 | 52.1 |
| Comparative Preparation Example 73 | 411.6 | 623.2 | 85.9 | 29.7 | 52.1 |
| Comparative Preparation Example 74 | 417.4 | 623.2 | 85.7 | 29.7 | 52.1 |
| Comparative Preparation Example 75 | 418.4 | 623.2 | 85.7 | 29.7 | 52.1 |
| Comparative Preparation Example 76 | 427.0 | 623.2 | 85.0 | 29.7 | 52.1 |

TABLE 14

| | λ_T30% @ 0° [nm] | λ_T30% @ 40° [nm] | \|λ_T30% @ 0°-λ_T30% @ 40°\| [nm] |
|---|---|---|---|
| Preparation Example 1 | 401.7 | 403.5 | 1.8 |
| Preparation Example 2 | 407.8 | 409.0 | 1.2 |
| Preparation Example 3 | 401.8 | 403.6 | 1.8 |
| Preparation Example 4 | 407.3 | 408.6 | 1.3 |
| Preparation Example 5 | 402.4 | 404.1 | 1.7 |
| Preparation Example 6 | 408.0 | 409.2 | 1.2 |
| Preparation Example 7 | 401.7 | 403.5 | 1.8 |
| Preparation Example 8 | 407.7 | 409.0 | 1.2 |
| Preparation Example 9 | 403.0 | 404.6 | 1.7 |
| Preparation Example 10 | 407.2 | 408.5 | 1.3 |
| Preparation Example 11 | 403.5 | 405.2 | 1.6 |
| Preparation Example 12 | 407.4 | 408.6 | 1.3 |
| Preparation Example 13 | 401.7 | 403.5 | 1.8 |
| Preparation Example 14 | 406.7 | 408.0 | 1.3 |
| Preparation Example 15 | 403.3 | 405.0 | 1.7 |
| Preparation Example 16 | 406.5 | 407.8 | 1.3 |
| Preparation Example 17 | 404.2 | 405.8 | 1.6 |
| Preparation Example 18 | 406.7 | 408.0 | 1.3 |
| Preparation Example 19 | 402.1 | 403.9 | 1.8 |
| Preparation Example 20 | 407.3 | 408.6 | 1.3 |
| Preparation Example 21 | 403.8 | 405.4 | 1.6 |
| Preparation Example 22 | 406.4 | 407.7 | 1.3 |

TABLE 14-continued

|  | λ_T30% @ 0° [nm] | λ_T30% @ 40° [nm] | \|λ_T30% @ 0°-λ_T30% @ 40°\| [nm] |
|---|---|---|---|
| Preparation Example 23 | 404.0 | 405.6 | 1.6 |
| Preparation Example 24 | 405.8 | 407.2 | 1.4 |

Experimental Example 2

The experiment as stated below was carried out to investigate the short wavelength shift of the transmission rate curve with respect to the incident angle of the optical filter.

First, the transmission spectrum was measured to each of the optical filters from Embodiments 1 to 24 and Comparative Examples 1 to 76 in 300 nm to 1,200 nm wavelength range and the incident angle of 0° condition using the spectrophotometer. As one example of the measurement result, each of transmission spectra measured to the optical filters according to Embodiment 3, Embodiment 6, Comparative Example 7 and Comparative Example 19 is illustrated in FIGS. 11 to 14, respectively.

From the obtained transmission rate curve at the incident angle of 0° and 40°, the integral value as to the transmission rate corresponding respective wavelength was calculated and then the changing rate of the integral value with respect to the incident angle change was calculated through the Equation 2 stated below.

$$|(A-B)/A|*100 \quad \text{[Equation 2]}$$

In Equation 2, A represents the integral value of the transmission rate measured at 0° incident angle condition in 380 nm to 780 nm wavelength range and B represents the integral value of the transmission rate measured at 40° incident angle condition in 380 nm to 780 nm wavelength range.

In addition, from the transmission rate curve measured at the incident angle of 0°, the shortest wavelength (λ_cut-off) where the transmission rate is 50% in the wavelength range longer than 565 nm wavelength and the average visible transmission rate in 430 nm to 565 nm wavelength range was calculated and they are stated in Table 15 together.

TABLE 15

| Optical Component Used | Transmission Rate Integral Value | | \|(A − B)/ A\| * 100 | λ_cut- off [nm] | Visible Light Average Transmission Rate [%] |
|---|---|---|---|---|---|
| | A | B | | | |
| Embodiment 1 | Preparation Example 1 | 21,560 | 21,588 | 0.13 | 649.5 | 94.3 |
| Embodiment 2 | Preparation Example 2 | 21,435 | 21,279 | 0.73 | 649.5 | 94.1 |
| Embodiment 3 | Preparation Example 3 | 20,847 | 21,015 | 0.81 | 641.6 | 93.5 |
| Embodiment 4 | Preparation Example 4 | 20,742 | 20,750 | 0.04 | 641.6 | 93.4 |
| Embodiment 5 | Preparation Example 5 | 20,748 | 20,915 | 0.81 | 640.6 | 93.4 |
| Embodiment 6 | Preparation Example 6 | 20,633 | 20,633 | 0.00 | 640.6 | 93.3 |
| Embodiment 7 | Preparation Example 7 | 21,425 | 21,479 | 0.25 | 647.6 | 94.2 |
| Embodiment 8 | Preparation Example 8 | 21,301 | 21,171 | 0.61 | 647.6 | 94.0 |
| Embodiment 9 | Preparation Example 9 | 20,727 | 20,883 | 0.76 | 639.9 | 93.5 |
| Embodiment 10 | Preparation Example 10 | 20,639 | 20,667 | 0.13 | 639.9 | 93.3 |
| Embodiment 11 | Preparation Example 11 | 20,575 | 20,739 | 0.80 | 638.4 | 93.3 |
| Embodiment 12 | Preparation Example 12 | 20,496 | 20,543 | 0.23 | 638.4 | 93.2 |
| Embodiment 13 | Preparation Example 13 | 21,202 | 21,299 | 0.46 | 644.5 | 94.0 |
| Embodiment 14 | Preparation Example 14 | 21,105 | 21,054 | 0.24 | 644.5 | 93.9 |
| Embodiment 15 | Preparation Example 15 | 20,568 | 20,740 | 0.84 | 637.6 | 93.3 |
| Embodiment 16 | Preparation Example 16 | 20,504 | 20,582 | 0.38 | 637.6 | 93.2 |
| Embodiment 17 | Preparation Example 17 | 20,370 | 20,549 | 0.88 | 635.7 | 93.1 |
| Embodiment 18 | Preparation Example 18 | 20,318 | 20,420 | 0.50 | 635.7 | 93.0 |
| Embodiment 19 | Preparation Example 19 | 21,089 | 21,194 | 0.50 | 642.7 | 93.9 |
| Embodiment 20 | Preparation Example 20 | 20,981 | 20,928 | 0.25 | 642.7 | 93.8 |
| Embodiment 21 | Preparation Example 21 | 20,554 | 20,715 | 0.78 | 637.0 | 93.3 |
| Embodiment 22 | Preparation Example 22 | 20,502 | 20,583 | 0.40 | 637.0 | 93.3 |
| Embodiment 23 | Preparation Example 23 | 20,365 | 20,551 | 0.91 | 635.2 | 93.1 |
| Embodiment 24 | Preparation Example 24 | 20,330 | 20,463 | 0.65 | 635.2 | 93.1 |
| Comparative Example 1 | Comparative Preparation Example 1 | 25,092 | 24,664 | 1.71 | 694.7 | 96.6 |
| Comparative Example 2 | Comparative Preparation Example 2 | 24,836 | 23,994 | 3.39 | 694.7 | 96.4 |
| Comparative Example 3 | Comparative Preparation Example 3 | 24,564 | 23,181 | 5.63 | 694.7 | 96.1 |
| Comparative Example 4 | Comparative Preparation Example 4 | 24,432 | 22,860 | 6.43 | 694.7 | 95.9 |
| Comparative Example 5 | Comparative Preparation Example 5 | 23,988 | 22,047 | 8.10 | 694.7 | 95.2 |
| Comparative Example 6 | Comparative Preparation Example 6 | 22,019 | 23,139 | 5.09 | 649.5 | 94.8 |
| Comparative Example 7 | Comparative Preparation Example 7 | 21,784 | 22,258 | 2.17 | 649.5 | 94.5 |
| Comparative Example 8 | Comparative Preparation Example 8 | 21,003 | 20,486 | 2.46 | 649.5 | 93.4 |
| Comparative Example 9 | Comparative Preparation Example 9 | 21,281 | 22,477 | 5.62 | 641.6 | 94.0 |
| Comparative Example 10 | Comparative Preparation Example 10 | 20,987 | 21,417 | 2.05 | 641.6 | 93.7 |
| Comparative Example 11 | Comparative Preparation Example 11 | 20,296 | 19,923 | 1.84 | 641.6 | 92.7 |
| Comparative Example 12 | Comparative Preparation Example 12 | 21,187 | 22,389 | 5.67 | 640.6 | 93.9 |

TABLE 15-continued

| Optical Component Used | Transmission Rate Integral Value A | Transmission Rate Integral Value B | \|(A − B)/A\| * 100 | λ_cutoff [nm] | Visible Light Average Transmission Rate [%] |
|---|---|---|---|---|---|
| Comparative Example 13 / Comparative Preparation Example 13 | 20,894 | 21,335 | 2.11 | 640.6 | 93.6 |
| Comparative Example 14 / Comparative Preparation Example 14 | 20,206 | 19,849 | 1.77 | 640.6 | 92.6 |
| Comparative Example 15 / Comparative Preparation Example 15 | 20,368 | 21,590 | 6.00 | 632.5 | 92.9 |
| Comparative Example 16 / Comparative Preparation Example 16 | 20,010 | 20,361 | 1.76 | 632.5 | 92.5 |
| Comparative Example 17 / Comparative Preparation Example 17 | 19,937 | 20,166 | 1.15 | 632.5 | 92.4 |
| Comparative Example 18 / Comparative Preparation Example 18 | 19,854 | 19,961 | 0.54 | 632.5 | 92.3 |
| Comparative Example 19 / Comparative Preparation Example 19 | 19,429 | 19,178 | 1.29 | 632.5 | 91.6 |
| Comparative Example 20 / Comparative Preparation Example 20 | 24,930 | 24,527 | 1.62 | 685.9 | 96.4 |
| Comparative Example 21 / Comparative Preparation Example 21 | 24,371 | 23,517 | 3.50 | 685.9 | 96.1 |
| Comparative Example 22 / Comparative Preparation Example 22 | 24,173 | 22,950 | 5.06 | 685.9 | 95.9 |
| Comparative Example 23 / Comparative Preparation Example 23 | 24,042 | 22,630 | 5.87 | 685.9 | 95.7 |
| Comparative Example 24 / Comparative Preparation Example 24 | 23,599 | 21,819 | 7.54 | 685.9 | 95.0 |
| Comparative Example 25 / Comparative Preparation Example 25 | 21,886 | 23,033 | 5.24 | 647.6 | 94.7 |
| Comparative Example 26 / Comparative Preparation Example 26 | 21,581 | 21,929 | 1.61 | 647.6 | 94.4 |
| Comparative Example 27 / Comparative Preparation Example 27 | 20,868 | 20,376 | 2.36 | 647.6 | 93.3 |
| Comparative Example 28 / Comparative Preparation Example 28 | 21,180 | 22,398 | 5.75 | 639.9 | 93.9 |
| Comparative Example 29 / Comparative Preparation Example 29 | 20,885 | 21,335 | 2.16 | 639.9 | 93.6 |
| Comparative Example 30 / Comparative Preparation Example 30 | 20,193 | 19,838 | 1.76 | 639.9 | 92.6 |
| Comparative Example 31 / Comparative Preparation Example 31 | 21,032 | 22,259 | 5.83 | 638.4 | 93.7 |
| Comparative Example 32 / Comparative Preparation Example 32 | 20,740 | 21,206 | 2.25 | 638.4 | 93.5 |
| Comparative Example 33 / Comparative Preparation Example 33 | 20,052 | 19,721 | 1.65 | 638.4 | 92.4 |
| Comparative Example 34 / Comparative Preparation Example 34 | 20,198 | 21,437 | 6.13 | 630.7 | 92.7 |
| Comparative Example 35 / Comparative Preparation Example 35 | 19,918 | 20,441 | 2.63 | 630.7 | 92.4 |
| Comparative Example 36 / Comparative Preparation Example 36 | 19,744 | 19,956 | 1.08 | 630.7 | 92.2 |
| Comparative Example 37 / Comparative Preparation Example 37 | 19,701 | 19,851 | 0.76 | 630.7 | 92.1 |
| Comparative Example 38 / Comparative Preparation Example 38 | 19,260 | 19,033 | 1.18 | 630.7 | 91.4 |
| Comparative Example 39 / Comparative Preparation Example 39 | 24,835 | 24,438 | 1.60 | 677.4 | 96.2 |
| Comparative Example 40 / Comparative Preparation Example 40 | 23,905 | 23,233 | 2.81 | 677.4 | 95.9 |
| Comparative Example 41 / Comparative Preparation Example 41 | 23,708 | 22,668 | 4.39 | 677.4 | 95.7 |
| Comparative Example 42 / Comparative Preparation Example 42 | 23,595 | 22,390 | 5.11 | 677.4 | 95.5 |
| Comparative Example 43 / Comparative Preparation Example 43 | 23,136 | 21,543 | 6.89 | 677.4 | 94.8 |
| Comparative Example 44 / Comparative Preparation Example 44 | 21,662 | 22,850 | 5.48 | 644.5 | 94.5 |
| Comparative Example 45 / Comparative Preparation Example 45 | 21,358 | 21,748 | 1.82 | 644.5 | 94.2 |
| Comparative Example 46 / Comparative Preparation Example 46 | 20,645 | 20,197 | 2.17 | 644.5 | 93.1 |
| Comparative Example 47 / Comparative Preparation Example 47 | 21,030 | 22,275 | 5.92 | 637.6 | 93.8 |
| Comparative Example 48 / Comparative Preparation Example 48 | 20,734 | 21,212 | 2.30 | 637.6 | 93.5 |
| Comparative Example 49 / Comparative Preparation Example 49 | 20,040 | 19,712 | 1.64 | 637.6 | 92.5 |
| Comparative Example 50 / Comparative Preparation Example 50 | 20,838 | 22,094 | 6.03 | 635.7 | 93.6 |
| Comparative Example 51 / Comparative Preparation Example 51 | 20,545 | 21,043 | 2.42 | 635.7 | 93.3 |
| Comparative Example 52 / Comparative Preparation Example 52 | 19,858 | 19,560 | 1.50 | 635.7 | 92.3 |
| Comparative Example 53 / Comparative Preparation Example 53 | 19,990 | 21,248 | 6.30 | 628.7 | 92.4 |
| Comparative Example 54 / Comparative Preparation Example 54 | 19,633 | 20,029 | 2.02 | 628.7 | 92.1 |
| Comparative Example 55 / Comparative Preparation Example 55 | 19,504 | 19,694 | 0.97 | 628.7 | 91.9 |
| Comparative Example 56 / Comparative Preparation Example 56 | 19,494 | 19,670 | 0.90 | 628.7 | 91.9 |
| Comparative Example 57 / Comparative Preparation Example 57 | 19,055 | 18,855 | 1.05 | 628.7 | 91.2 |
| Comparative Example 58 / Comparative Preparation Example 58 | 24,684 | 24,216 | 1.90 | 669.5 | 96.0 |

TABLE 15-continued

| Optical Component Used | Comparative Preparation | Transmission Rate Integral Value A | Transmission Rate Integral Value B | \|(A − B)/A\| * 100 | λ_cut-off [nm] | Visible Light Average Transmission Rate [%] |
|---|---|---|---|---|---|---|
| Comparative Example 59 | Comparative Preparation Example 59 | 23,605 | 23,173 | 1.83 | 669.5 | 95.7 |
| Comparative Example 60 | Comparative Preparation Example 60 | 23,364 | 22,463 | 3.85 | 669.5 | 95.5 |
| Comparative Example 61 | Comparative Preparation Example 61 | 23,246 | 22,176 | 4.61 | 669.5 | 95.3 |
| Comparative Example 62 | Comparative Preparation Example 62 | 22,788 | 21,331 | 6.40 | 669.5 | 94.6 |
| Comparative Example 63 | Comparative Preparation Example 63 | 21,558 | 22,768 | 5.62 | 642.7 | 94.4 |
| Comparative Example 64 | Comparative Preparation Example 64 | 21,209 | 21,531 | 1.52 | 642.7 | 94.1 |
| Comparative Example 65 | Comparative Preparation Example 65 | 20,537 | 20,109 | 2.08 | 642.7 | 93.1 |
| Comparative Example 66 | Comparative Preparation Example 66 | 21,030 | 22,291 | 5.99 | 637.0 | 93.8 |
| Comparative Example 67 | Comparative Preparation Example 67 | 20,690 | 21,089 | 1.93 | 637.0 | 93.5 |
| Comparative Example 68 | Comparative Preparation Example 68 | 20,034 | 19,707 | 1.63 | 637.0 | 92.5 |
| Comparative Example 69 | Comparative Preparation Example 69 | 20,837 | 22,109 | 6.10 | 635.2 | 93.6 |
| Comparative Example 70 | Comparative Preparation Example 70 | 20,500 | 20,921 | 2.05 | 635.2 | 93.3 |
| Comparative Example 71 | Comparative Preparation Example 71 | 19,850 | 19,554 | 1.49 | 635.2 | 92.3 |
| Comparative Example 72 | Comparative Preparation Example 72 | 19,830 | 21,103 | 6.42 | 627.2 | 92.3 |
| Comparative Example 73 | Comparative Preparation Example 73 | 19,512 | 19,997 | 2.49 | 627.2 | 91.9 |
| Comparative Example 74 | Comparative Preparation Example 74 | 19,368 | 19,610 | 1.25 | 627.2 | 91.8 |
| Comparative Example 75 | Comparative Preparation Example 75 | 19,335 | 19,531 | 1.01 | 627.2 | 91.7 |
| Comparative Example 76 | Comparative Preparation Example 76 | 18,897 | 18,718 | 0.95 | 627.2 | 91.0 |

Referring Table 15, if the optical filters including the optical components from Comparative Preparation Examples 1 to 76 where they do not have either one of the first or the second transmission cut-off region or both of them, or do have both of them but W1 and W2 are out of 25 nm to 45 nm because either one or both of the wavelength width (W1) of the first transmission cut-off region and the wavelength width (W2) of the second transmission cut-off region is/are excessively wide can easily cause significant color difference with respect to the incident angle since the difference of the integral value is 1% or more, even 7% or more and even if it is suppressed to below 1%, a problem is caused in that it is difficult to precisely detect the captured image taken in a low light capturing environment since the visible light average transmission rate is reduced to 91% level.

In contrast, it can be seen that the optical filters including the optical components according to Preparation Examples 1 to 24 having the first transmission cut-off region with the wavelength width (W1) of 5 nm to 25 nm and the second transmission cut-off region with the wavelength width (W2) of 5 nm to 45 nm and having an OD2 of 0.2 to 0.4 suppress the difference of the integral value within 1% by suppressing the short wavelength shift at the visible light transmission curve even if the incident angle is increased from 0° to 40° and they also disclose the excellent characteristic of 93% or more as for the visible light transmission rate. Furthermore, they can sufficiently reproduce the original color when they are parallelly used with the commercial image sensor since λ_cut-off is in 630 nm to 655 nm range.

What is claimed is:
1. An optical component comprising,
a near-infrared absorption glass substrate including Copper II ions as a coloring component, and a shortest wavelength (Cut-off T50%) which has an average transmission rate being 90% or more in a wavelength range between 430 nm and 565 nm and a transmission rate being 50% in wavelength range between 660 nm to 690 nm; and
a dye dispersion layer which is formed on one or both sides of the near-infrared absorption glass substrate and in which a near-infrared absorption dye and an ultraviolet absorption dye is dispersed in a resin matrix,
wherein the optical component comprises a first transmission cut-off region showing 1% or less transmission rate in 690 nm to 730 nm wavelength region and a second transmission cut-off region showing 25% or less transmission rate in 360 nm to 410 nm wavelength region when a transmission rate curve for the optical component is measured at 0° incident angle using a spectrophotometer in a wavelength range of 300 nm to 1,200 nm and the optical component satisfies a following condition (A) to (B),
(A) a wavelength width (W1) at the first transmission cut-off region is 5 nm to 25 nm and
(B) a wavelength width (W2) at the second transmission cut-off region is 5 nm to 45 nm, and
wherein the near-infrared absorption dye and the ultraviolet absorption dye include one or more compounds represented by following Formula 1 and Formula 2

[Formula 1]

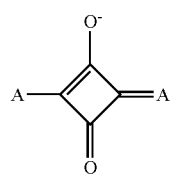

[Formula 2]

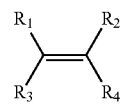

in Formula 1, wherein A is an aminophenyl group; an indolyl methylene group; or an indolinyl group, two As have a structure forming a conjugation each other with a center of

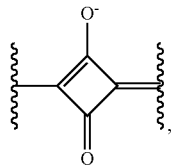 [SMILES: *C1=C([O-])C(=*)C1=O]

one or more of hydrogen existing in the aminophenyl group, the indolyl methylene group or the indolinyl are each independently, hydrogen, a halogen group, a hydroxy group, a cyano group, a nitro group, a carboxyl group, an alkyl group with a carbon number of 1 to 20, a cycloalkyl group with a carbon number of 3 to 20, an alkoxy group with a carbon number of 1 to 10, an aralkyl group with a carbon number of 7 to 20, a sulfonamide group or an amide group substituted or unsubstituted with the alkyl group with a carbon number of 1 to 4, a haloalkyl group with a carbon number of 1 to 4 or an aralkyl with a carbon number of 7 to 20, in the Formula 2, wherein R1 to R3 are each independently represented by hydrogen, a cyano group, an amino group or following Formula 2-a

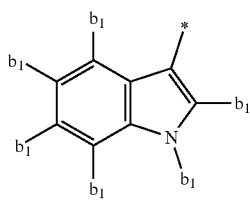

Formula 1 can be is any one of compounds represented by Formula 1a to Formula 1c, [Formula 1]

wherein the near-infrared absorption dye has a maximum absorption region in 690 nm to 750 nm range and the ultraviolet absorption dye has a maximum absorption region in 350 nm to 410 nm range: and Formula 1 is any one of compounds represented by Formula 1a to Formula 1c,

[Formula 1a]

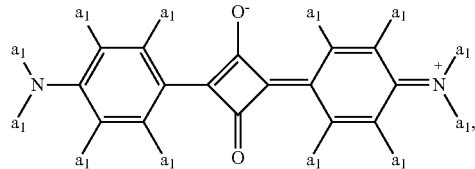

[Formula 1b]

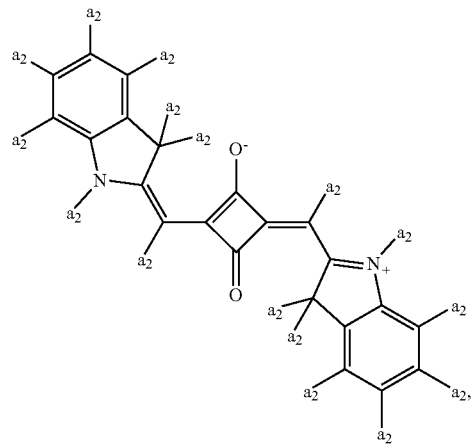

and

[Formula 1c]

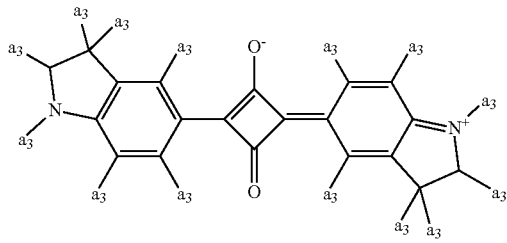

and in the Formula 1a to the Formula 1c, wherein $a_1$, $a_2$, and $a_3$ are each independently hydrogen, a halogen group, a hydroxyl group, a cyano group, a nitro group, a carboxy group, an alkyl group with a carbon number of 1 to 10, a cycloalkyl group with a carbon number of 3 to 10, an alkoxy group with a carbon number of 1 to 6, an aralkyl group with a carbon number of 7 to 20, a sulfonamide group or an amide group substituted or unsubstituted with the alkyl group with a carbon number of 1 to 4, a haloalkyl group with a carbon number of 1 to 4 of or an aralkyl group with a carbon number of 7 to 20, and

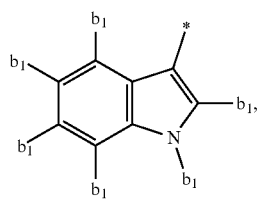

in Formula 2-a, $b_1$ are each independently hydrogen, an alkyl group with a carbon number of 1 to 20, a cycloalkyl group with a carbon number of 3 to 20, an alkoxy group with a carbon number of 1 to 10, an aralkyl group with a carbon number of 7 to 20 or an aryl group with a carbon number of 6 to 18, $R_4$ is represented by hydrogen, a cyano group or the following Formula 2-b,

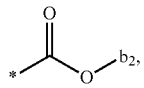 [Formula 2-b]

and in Formula 2-b, $b_2$ is hydrogen, an alkyl group with a carbon number of 1 to 18, or an amino group and one or more hydrogen of $R_1$ to $R_4$ of the Formula 2 are each independently substituted or unsubstituted with one selected from a group consisting of an alkyl group with a carbon number of 1 to 6, an alkenyl group with a carbon number of 1 to 6, an alkoxy group with a carbon number of 1 to 6, and an aryl with a carbon number of 6 to 20, a heteroaryl group with a carbon number of 2 to 20, an aryloxy group with a carbon number of 6 to 20, an arylthio group with a carbon number of 6 to 20, an alkoxycarbonyl group with a carbon number of 1 to 6, a halogen group, a cyano group, a nitro group, a hydroxyl group and a carboxy group.

2. The optical component of claim 1, wherein when an absorbance curve for the optical component is normalized to be 1 (one) for a maximum value of absorbance in a wavelength region of the first transmission cut-off region, a maximum value of absorbance (OD2) in a wavelength range of the second transmission cut-off region satisfies the following condition of Equation 1:

$$0.2 \leq OD2 \leq 0.4. \qquad \text{Equation 1}$$

3. The optical component of claim 1, wherein a longest wavelength ($\lambda\_cut\text{-}on$) where a transmission rate is 50% in a wavelength range shorter than 430 nm wavelength exists when a transmission rate curve of the optical component is measured at 0° incident angle condition using the spectrophotometer in 300 nm to 1,200 nm wavelength range, and a shortest wavelength ($\lambda\_cut\text{-}off$) where a transmission rate is 50% in a wavelength range longer than 565 nm wavelength exists in 625 nm to 645 nm wavelength range.

4. The optical component of claim 1, wherein an average transmission rate is 87% or more in 430 nm to 565 nm wavelength range when a transmission rate curve of the optical component is measured at 0° incident angle condition using the spectrophotometer in 300 nm to 1,200 nm wavelength range.

5. The optical component of claim 1, wherein the average transmission rate is 25% or more in between 800 nm to 1,200 nm and the transmission rate is 50% or more in 1,200 nm wavelength when the transmission curve of the optical component is measured at 0° incident angle condition using the spectrophotometer in 300 nm to 1,200 nm wavelength range.

6. The optical component of claim 1, wherein an absolute value of a difference between a wavelength ($\lambda\_T30\%@0°$) where the transmission rate of 30% measured at 0° incident angle condition in 400 nm to 410 nm wavelength range and a wavelength ($\lambda\_T30\%@40°$) where the transmission rate of 30% measured at 40° incident angle condition in 400 nm to 410 nm wavelength range is 2 nm or less when a transmission rate curve of the optical component is measured at 0° and 40° incident angle condition using the spectrophotometer in 300 nm to 1,200 nm wavelength range.

7. The optical component of claim 1, wherein a combined amount of the near-infrared absorption dye and the ultraviolet absorption dye is in 2.5 to 5.5 parts by weight range when an amount of the dye dispersion layer is 100 parts by weight.

8. The optical component of claim 1, wherein the dye dispersion layer has an amount ratio of the ultraviolet absorption dye with respect to the near-infrared absorption dye being in 0.5 to 0.3 parts by weight range.

9. The optical component of claim 1, wherein a thickness of the near-infrared absorption glass substrate is 0.140 mm to 0.220 mm.

10. The optical component of claim 1, wherein the resin matrix includes a polymer resin selected from the group consisting of a polyester resin, a polycarbonate resin, an acrylic resin, a polyolefin resin, a cyclic olefin resin, a polyimide resin, a polyamide resin and a polyurethane resin.

11. An optical filter comprising the optical component according to claim 1;
a first selective wavelength reflecting layer formed on one side of the optical component;
a second selective wavelength reflecting layer formed on the other side of the optical component wherein the optical filter satisfies the following Equation 2:

$$|(A-B)/A|* 100 \leq 1\% \qquad \text{Equation 2, and}$$

in Equation 2, A represents an integral value of the transmission rate when a transmission rate curve of the optical filter is measured at 0° incident angle condition using the spectrophotometer in a wavelength range of 380 nm to 780 nm, and B shows an integral value of the transmission rate when the transmission curve of the optical filter is measured under 40° incident angle condition using the spectrophotometer in a wavelength range of 380 nm to 780 nm.

12. The optical filter of claim 11, wherein the shortest wavelength ($\lambda\_cut\text{-}off$) of the optical component where the transmission rate is 50% in a wavelength range longer than 565 nm wavelength is shown in 630 nm to 655 nm wavelength range when a transmission rate curve of the optical filter is measured at 0° incident angle condition using the spectrophotometer in 300 nm to 1,200 nm wavelength range.

13. The optical filter of claim 11, wherein an average transmission rate is 93% or more in 430 nm to 565 nm wavelength range when the transmission rate curve of the optical filter is measured at 0° incident angle condition using the spectrophotometer in 300 nm to 1,200 nm wavelength range.

14. An image capturing device comprising the optical filter according to claim 11.

* * * * *